United States Patent
Ellison et al.

(10) Patent No.: US 7,082,615 B1
(45) Date of Patent: Jul. 25, 2006

(54) PROTECTING SOFTWARE ENVIRONMENT IN ISOLATED EXECUTION

(75) Inventors: Carl M. Ellison, Portland, OR (US); Roger A. Golliver, Beaverton, OR (US); Howard C. Herbert, Phoenix, AZ (US); Derrick C. Lin, San Mateo, CA (US); Francis X. McKeen, Portland, OR (US); Gilbert Neiger, Portland, OR (US); Ken Reneris, Wilbraham, MA (US); James A. Sutton, Portland, OR (US); Shreekant S. Thakkar, Portland, OR (US); Millind Mittal, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 687 days.

(21) Appl. No.: 09/668,610

(22) Filed: Sep. 22, 2000

Related U.S. Application Data

(63) Continuation-in-part of application No. 09/540,946, filed on Mar. 31, 2000.

(51) Int. Cl.
*G06F 7/04* (2006.01)
(52) U.S. Cl. .................. 726/26; 713/190; 713/165; 380/44; 711/163
(58) Field of Classification Search ............. 713/2, 713/165, 170, 190, 200, 164; 380/44, 45; 711/163; 726/26
See application file for complete search history.

(56) References Cited

U.S. PATENT DOCUMENTS

| | | |
|---|---|---|
| 3,699,532 A | 10/1972 | Schaffer et al. |
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. |
| 4,276,594 A | 6/1981 | Morley |
| 4,278,837 A | 7/1981 | Best |
| 4,307,447 A | 12/1981 | Provanzano et al. |
| 4,319,233 A | 3/1982 | Matsuoka et al. |

(Continued)

FOREIGN PATENT DOCUMENTS

DE  4217444  12/1992

(Continued)

OTHER PUBLICATIONS

"M68040 User's Manual", 1993, Motorola Inc., p. 1-5-p. 1-9, p. 1-13-p. 1-20, p. 2-1-p. 2-3, p. 4-1, p. 8-9-p. 8-11.

(Continued)

*Primary Examiner*—Christopher Revak
*Assistant Examiner*—Kavesh Abrishamkar
(74) *Attorney, Agent, or Firm*—Michael R. Barre

(57) ABSTRACT

The present invention is a method and apparatus to protect a subset of a software environment. A key generator generates an operating system nub key (OSNK). The OSNK is unique to an operating system (OS) nub. The OS nub is part of an operating system in a secure platform. A usage protector uses the OSNK to protect usage of a subset of the software environment.

40 Claims, 13 Drawing Sheets

U.S. PATENT DOCUMENTS

| | | | |
|---|---|---|---|
| 4,319,323 A | 3/1982 | Ermolovich et al. | |
| 4,347,565 A | 8/1982 | Kaneda et al. | |
| 4,366,537 A | 12/1982 | Heller et al. | |
| 4,403,283 A | 9/1983 | Myntti et al. | |
| 4,419,724 A | 12/1983 | Branigin et al. | |
| 4,430,709 A | 2/1984 | Schleupen | |
| 4,521,852 A | 6/1985 | Guttag | |
| 4,571,672 A | 2/1986 | Hatada et al. | |
| 4,759,064 A | 7/1988 | Chaum | |
| 4,795,893 A | 1/1989 | Ugon | |
| 4,802,084 A | 1/1989 | Ikegaya et al. | |
| 4,975,836 A | 12/1990 | Hirosawa et al. | |
| 5,007,082 A | 4/1991 | Cummins | |
| 5,022,077 A | 6/1991 | Bealkowski et al. | |
| 5,075,842 A | 12/1991 | Lai | |
| 5,079,737 A | 1/1992 | Hackbarth | |
| 5,187,802 A | 2/1993 | Inoue et al. | |
| 5,230,069 A | 7/1993 | Brelsford et al. | |
| 5,237,616 A | 8/1993 | Abraham et al. | |
| 5,255,379 A | 10/1993 | Melo | |
| 5,287,363 A | 2/1994 | Wolf et al. | |
| 5,293,424 A | 3/1994 | Holtey et al. | |
| 5,295,251 A | 3/1994 | Wakui et al. | |
| 5,303,378 A | 4/1994 | Cohen | |
| 5,317,705 A | 5/1994 | Gannon et al. | |
| 5,319,760 A | 6/1994 | Mason et al. | |
| 5,361,375 A | 11/1994 | Ogi | |
| 5,386,552 A | 1/1995 | Garney | |
| 5,421,006 A | 5/1995 | Jablon et al. | |
| 5,437,033 A | 7/1995 | Inoue et al. | |
| 5,455,909 A | 10/1995 | Blomgren et al. | |
| 5,459,867 A | 10/1995 | Adams et al. | |
| 5,459,869 A | 10/1995 | Spilo | |
| 5,469,557 A | 11/1995 | Salt et al. | |
| 5,473,692 A | 12/1995 | Davis | |
| 5,479,509 A | 12/1995 | Ugon | |
| 5,504,922 A | 4/1996 | Seki et al. | |
| 5,506,975 A | 4/1996 | Onodera | |
| 5,511,217 A | 4/1996 | Nakajima et al. | |
| 5,522,075 A | 5/1996 | Robinson et al. | |
| 5,555,385 A | 9/1996 | Osisek | |
| 5,555,414 A | 9/1996 | Hough et al. | |
| 5,560,013 A | 9/1996 | Scalzi et al. | |
| 5,564,040 A | 10/1996 | Kubala | |
| 5,568,552 A | 10/1996 | Davis | |
| 5,574,936 A | 11/1996 | Ryba et al. | |
| 5,582,717 A | 12/1996 | Di Santo | |
| 5,604,805 A | 2/1997 | Brands | |
| 5,606,617 A | 2/1997 | Brands | |
| 5,615,263 A | 3/1997 | Takahashi | |
| 5,628,022 A | 5/1997 | Ueno et al. | |
| 5,633,929 A | 5/1997 | Kaliski, Jr. | |
| 5,657,445 A | 8/1997 | Pearce | |
| 5,668,971 A | 9/1997 | Neufeld | |
| 5,684,948 A | 11/1997 | Johnson et al. | |
| 5,706,469 A | 1/1998 | Kobayashi | |
| 5,717,903 A | 2/1998 | Bonola | |
| 5,729,760 A | 3/1998 | Poisner | |
| 5,737,604 A | 4/1998 | Miller et al. | |
| 5,737,760 A | 4/1998 | Grimmer, Jr. et al. | |
| 5,740,178 A | 4/1998 | Jacks et al. | |
| 5,752,046 A | 5/1998 | Oprescu et al. | |
| 5,757,919 A | 5/1998 | Herbert et al. | |
| 5,764,969 A | 6/1998 | Kahle et al. | |
| 5,796,845 A | 8/1998 | Serikawa et al. | |
| 5,805,712 A | 9/1998 | Davis | |
| 5,809,546 A | 9/1998 | Greenstein et al. | |
| 5,825,880 A | 10/1998 | Sudia et al. | |
| 5,835,594 A | 11/1998 | Albrecht et al. | |
| 5,844,986 A | 12/1998 | Davis | |
| 5,852,717 A | 12/1998 | Bhide et al. | |
| 5,854,913 A | 12/1998 | Goetz et al. | |
| 5,872,994 A | 2/1999 | Akiyama et al. | |
| 5,890,189 A | 3/1999 | Nozue et al. | |
| 5,898,883 A | 4/1999 | Fujii et al. | |
| 5,901,225 A | 5/1999 | Ireton et al. | |
| 5,919,257 A | 7/1999 | Trostle | |
| 5,935,242 A | 8/1999 | Madany et al. | |
| 5,935,247 A | 8/1999 | Pai et al. | |
| 5,937,063 A | 8/1999 | Davis | |
| 5,950,221 A | 9/1999 | Draves et al. | |
| 5,953,502 A | 9/1999 | Helbig, Sr. | |
| 5,956,408 A | 9/1999 | Arnold | |
| 5,970,147 A | 10/1999 | Davis | |
| 5,978,475 A | 11/1999 | Schneier et al. | |
| 5,978,481 A | 11/1999 | Ganesan et al. | |
| 5,987,557 A | 11/1999 | Ebrahim | |
| 6,014,745 A | 1/2000 | Ashe | |
| 6,035,374 A | 3/2000 | Panwar et al. | |
| 6,044,478 A | 3/2000 | Green | |
| 6,055,637 A | 4/2000 | Hudson et al. | |
| 6,058,478 A | 5/2000 | Davis | |
| 6,061,794 A | 5/2000 | Angelo et al. | |
| 6,075,938 A | 6/2000 | Bugnion et al. | |
| 6,085,296 A | 7/2000 | Karkhanis et al. | |
| 6,088,262 A | 7/2000 | Nasu | |
| 6,092,095 A | 7/2000 | Maytal | |
| 6,093,213 A | 7/2000 | Favor et al. | |
| 6,101,584 A | 8/2000 | Satou et al. | |
| 6,108,644 A | 8/2000 | Goldschlag et al. | |
| 6,115,816 A | 9/2000 | Davis | |
| 6,125,430 A | 9/2000 | Noel et al. | |
| 6,131,166 A | 10/2000 | Wong-Insley | |
| 6,148,379 A | 11/2000 | Schimmel | |
| 6,158,546 A | 12/2000 | Hanson et al. | |
| 6,173,417 B1 | 1/2001 | Merrill | |
| 6,175,924 B1 | 1/2001 | Arnold | |
| 6,175,925 B1 | 1/2001 | Nardone et al. | |
| 6,178,509 B1 | 1/2001 | Nardone et al. | |
| 6,182,089 B1 | 1/2001 | Ganapathy et al. | |
| 6,188,257 B1 | 2/2001 | Buer | |
| 6,192,455 B1 | 2/2001 | Bogin et al. | |
| 6,199,152 B1 | 3/2001 | Kelly et al. | |
| 6,205,550 B1 | 3/2001 | Nardone et al. | |
| 6,212,635 B1 | 4/2001 | Reardon | |
| 6,222,923 B1 | 4/2001 | Schwenk | |
| 6,226,749 B1 | 5/2001 | Carloganu et al. | |
| 6,249,872 B1 | 6/2001 | Wildgrube et al. | |
| 6,252,650 B1 | 6/2001 | Nakamura | |
| 6,269,392 B1 | 7/2001 | Cotichini et al. | |
| 6,272,533 B1 | 8/2001 | Browne | |
| 6,272,637 B1 | 8/2001 | Little et al. | |
| 6,275,933 B1 | 8/2001 | Fine et al. | |
| 6,282,650 B1 | 8/2001 | Derek | |
| 6,282,651 B1 | 8/2001 | Ashe | |
| 6,282,657 B1 | 8/2001 | Kaplan et al. | |
| 6,292,874 B1 * | 9/2001 | Barnett | 711/153 |
| 6,301,646 B1 | 10/2001 | Hostetter | |
| 6,314,409 B1 | 11/2001 | Schneck et al. | |
| 6,321,314 B1 | 11/2001 | Van Dyke | |
| 6,327,652 B1 * | 12/2001 | England et al. | 713/2 |
| 6,330,670 B1 * | 12/2001 | England et al. | 713/2 |
| 6,339,815 B1 | 1/2002 | Feng et al. | |
| 6,339,816 B1 | 1/2002 | Bausch | |
| 6,357,004 B1 | 3/2002 | Davis | |
| 6,363,485 B1 | 3/2002 | Adams et al. | |
| 6,374,317 B1 | 4/2002 | Ajanovic et al. | |
| 6,378,068 B1 | 4/2002 | Foster et al. | |
| 6,378,072 B1 | 4/2002 | Collins et al. | |
| 6,389,537 B1 | 5/2002 | Davis et al. | |
| 6,397,242 B1 | 5/2002 | Devine et al. | |
| 6,397,379 B1 | 5/2002 | Yates, Jr. et al. | |
| 6,412,035 B1 | 6/2002 | Webber | |
| 6,421,702 B1 | 7/2002 | Gulick | |

| | | |
|---|---|---|
| 6,445,797 B1 | 9/2002 | McGough et al. |
| 6,463,535 B1 | 10/2002 | Drews et al. |
| 6,463,537 B1 | 10/2002 | Tello |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B1 | 4/2003 | Vu et al. |
| 6,560,627 B1 | 5/2003 | McDonald et al. |
| 6,609,199 B1 | 8/2003 | DeTreville |
| 6,615,278 B1* | 9/2003 | Curtis ........................ 719/310 |
| 6,633,963 B1* | 10/2003 | Ellison et al. .............. 711/163 |
| 6,633,981 B1 | 10/2003 | Davis |
| 6,651,171 B1 | 11/2003 | England et al. |
| 6,678,825 B1* | 1/2004 | Ellison et al. .............. 713/200 |
| 6,684,326 B1 | 1/2004 | Cromer et al. |
| 6,701,284 B1 | 3/2004 | Huntley et al. |
| 2001/0021969 A1 | 9/2001 | Burger et al. |
| 2001/0027527 A1 | 10/2001 | Khidekel et al. |
| 2001/0037450 A1 | 11/2001 | Melitski et al. |

FOREIGN PATENT DOCUMENTS

| | | |
|---|---|---|
| EP | 0473913 | 3/1992 |
| EP | 0600112 | 8/1994 |
| EP | 0892521 | 1/1999 |
| EP | 0930567 A | 7/1999 |
| EP | 0961193 | 12/1999 |
| EP | 0965902 | 12/1999 |
| EP | 1 030 237 A | 8/2000 |
| EP | 1055989 | 11/2000 |
| EP | 1056014 | 11/2000 |
| EP | 1085396 | 3/2001 |
| EP | 1146715 | 10/2001 |
| JP | 11161521 A | 6/1999 |
| WO | WO9524696 | 9/1995 |
| WO | WO 97/29567 | 8/1997 |
| WO | WO9812620 | 3/1998 |
| WO | WO983465 A | 8/1998 |
| WO | WO9844402 | 10/1998 |
| WO | WO9905600 | 2/1999 |
| WO | WO9909482 | 2/1999 |
| WO | WO9918511 | 4/1999 |
| WO | WO 99/38076 | 7/1999 |
| WO | WO9957863 | 11/1999 |
| WO | WO99/65579 | 12/1999 |
| WO | 02000076139 A | 3/2000 |
| WO | WO0021238 | 4/2000 |
| WO | WO0062232 | 10/2000 |
| WO | WO 01/27723 A | 4/2001 |
| WO | WO 01/27821 A | 4/2001 |
| WO | WO0163994 | 8/2001 |
| WO | WO 01 75564 A | 10/2001 |
| WO | WO 01/75565 | 10/2001 |
| WO | WO 01/75595 | 10/2001 |
| WO | WO0175565 | 10/2001 |
| WO | WO0175595 | 10/2001 |
| WO | WO0201794 | 1/2002 |
| WO | WO 02 17555 A | 2/2002 |
| WO | WO02060121 | 8/2002 |
| WO | WO 02 086684 A | 10/2002 |
| WO | WO03058412 | 7/2003 |

OTHER PUBLICATIONS

"Intel 386 DX Microprocessor 32-Bit CHMOS Microprocessor with Integrated Memory Management", Dec. 31, 1995, Intel Inc., p. 32-56; figure 4-14.

Joe Heinrich:"MIPS R4000 Microprocessor User's Manual", 1994, MIPS Technology Inc., Mountain View, CA, pp. 67-79.

Berg C: "How Do I Create a Signed Applet?", Dr. Dobb's Journal, M&T Publ., Redwood City, CA, US, vol. 22, No. 8, 8 '97, p. 109-111, 122.

Goldberg, R, "Survey of virtual machine research," IEEE Computer Magazine 7(6), pp. 34-45, 1974.

Gum, P.H., "System/370 Extended Architecture: Facilities for Virtual Machines," IBM J. Research Development, vol. 27, No. 6, pp. 530-544, Nov. 1983.

Rosenblum, M., "Vmware's Virtual Platform: A Virtual Machine Monitor for Commodity PCs," Proceedings of the 11th Hotchips Conference, pp. 185-196, Aug. 1999.

Lawton, K., "Running Multiple Operating Systems Concurrently on an IA32 PC Using Virtualization Techniques," http://www.plex86.org/research/paper.txt; Nov. 29, 1999; pp. 1-31.

"Information Display Technique for a Terminate Stay Resident Program," IBM Technical Disclosure Bulletin, TDB-ACC-No. NA91 NA9112156, Dec. 1, 1991, pp. 156-158, vol. 34, Issue No. 7A.

Robin, John Scott and Irvine, Cynthia E., "Analysis of the Pentium's Ability to Support a Secure Virtual Machine Monitor," Proceedings of the 9th USENIX Security Symposium, Aug. 14, 2000, pp. 1-17. XP002247347, Denver, CO.

Karger, Paul A., et al., "A VMM Security Kernel for the VAX Architecture," Proceedings of the Symposium on Research in Security and Privacy, May 7, 1990, pp. 2-19, XP010020182, ISBN: 0-8186-2060-9, Boxborough, MA.

Chien, Andrew A., et al., "Safe and Protected Execution for the Morph/AMRM Reconfigurable Processor," 7th Annual IEEE Symposium, FCCM '99 Proceedings Apr. 21, 1999, pp. 209-221, XP010359180, ISBN: 0-7695-0375-6, Los Alamitos, CA.

Brands, Stefan, "Restrictive Blinding of Secret-Key Certificates", *Springer-Verlag XP002201306*, (1995), Chapter 3.

Davida, George I., et al., "Defending Systems Against Viruses through Cryptographic Authentication", *Proceedings of the Symposium on Security and Privacy*, IEEE Comp. Soc. Press, ISBN 0-8186-1939-2, (May 1989).

Kashiwagi, Kazuhiko, et al., "Design and Implementation of Dynamically Reconstructing System-Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8, (1996).

Luke, Jahn, et al., "Replacement Strategy for Aging Avionics Computers", *IEEE AES Systems Magazine*, XP002190614, (Mar. 1999).

Menezes, Oorschot, "Handbook of Applied Cryptography", *CRC Press LLC*, USA XP002201307, (1997), 475.

Richt, Stefan, et al., "In-Circuit-Emulator Wird Echtzeit-tauglich", *Elektronic, Franzis Verlag GMBH*, Munchen, DE, vol. 40 No. 16, XP00259620,(100-103),Aug. 6, 1991.

Saez, Sergio, et al., "A Hardware Scheduler for Complex Real-Time Systems", *Proceedings of the IEEE International Symposium on Industrial Electronics*, XP002190615, (Jul. 1999), 43-48.

Sherwood, Timothy, et al., "Patchable Instruction ROM Architecture", *Department of Computer Science and Engineering, University of California, San Diego, La Jolla, CA*, (Nov. 2001).

J. Heinrich: "MIPS R4000 Microprocessor User's Manual," Apr. 1, 1993, MIPS, Mt. View, XP002184449, pp. 61-97.

Colouris, George, et al., "Distributed Systems, Concepts and Designs", *2nd Edition*, (1994),422-424.

Crawford, John, "Architecture of the Intel 80386", *Proceedings of the IEEE International Conference on Computer Design; VLSI in Computers and Processors (ICCD '86)*, (Oct. 6, 1986), 155-160.

Fabry, R.S., "Capability-Based Addressing", *Fabry, R.S., "Capability-Based Addressing," Communications of the ACM*, vol. 17, No. 7, (Jul. 1974), 403-412.

Frieder, Gideon, "The Architecture And Operational Characteristics of the VMX Host Machine", *The Architecture And Operational Characteristics of the VMX Host Machine, IEEE*, (1982),9-16.

Intel Corporation, "IA-64 System Abstraction Layer Specification", *Intel Product Specification* Order No. 245359-001. (Jan. 2000), 1-112.

Intel Corporation, "Intel IA-64 Architecture Software Developer's Manual", vol. 2: IA-64 System Architecture, Order No. 245318-001, (Jan. 2000), i, ii, 5.1-5.3, 11.1-11.8, 11.23-11.26.

Menezes, Alfred J., et al., "Handbook of Applied Cryptography", *CRC Press Series on Discrete Mathematics and its Applications*, Boca Raton, FL, XP002165287, ISBN 0849385237, (Oct. 1996), 403-405, 506-515, 570.

Namba, S., et al., "VM/4: ACOS-4 Virtual Machine Architecture", *VM/4 ACOS-4 Virtual Machine Architecture, IEEE*, (1985), 171-178.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Schneier, Bruce, "Applied Cryptography: Protocols, Algorithm, and Source Code in C", *Wiley John & Sons, Inc.*, XP002939871; ISBN 0471117099, (Oct. 1995),47-52.

Schneier, Bruce, "Applied Cryptography: Protocols, Algorithm, and Source Code in C", *Wiley, John & Sons, Inc.*, XP002138607; ISBN 0471117099,(Oct. 1995), 56-65.

Schneier, Bruce, "Applied Cryptography: Protocols, Algorithms, and Source Code C", *Wiley, John & Sons, Inc.*, XP0021111449; ISBN 0471117099,(Oct. 1995), 169-187.

Schneier, Bruce, "Applied Cryptography: Protocols, Algorithms, and Source Code in C", *2nd Edition; Wiley, John & Sons, Inc.*, XP002251738; ISBN 0471128457,(Nov. 1995),28-33; 176-177; 216-217; 461-473; 518-522.

* cited by examiner

PROTECTING SOFTWARE ENVIRONMENT IN ISOLATED EXECUTION

CROSS-REFERENCES TO RELATED APPLICATIONS

This is a continuation-in-part of U.S. patent application Ser. No. 09/540,946 filed Mar. 31, 2000.

BACKGROUND

1. Field of the Invention

This invention relates to microprocessors. In particular, the invention relates to processor security.

2. Description of Related Art

Advances in microprocessor and communication technologies have opened up many opportunities for applications that go beyond the traditional ways of doing business. Electronic commerce (E-commerce) and business-to-business (B2B) transactions are now becoming popular, reaching the global markets at a fast rate. Unfortunately, while modem microprocessor systems provide users convenient and efficient methods of doing business, communicating and transacting, they are also vulnerable to unscrupulous attacks. Examples of these attacks include virus, intrusion, security breach, and tampering, to name a few. Computer security, therefore, is becoming more and more important to protect the integrity of the computer systems and increase the trust of users.

Threats caused by unscrupulous attacks may be in a number of forms. Attacks may be remote without requiring physical accesses. An invasive remote-launched attack by hackers may disrupt the normal operation of a system connected to thousands or even millions of users. A virus program may corrupt code and/or data of a single-user platform.

Existing techniques to protect against attacks have a number of drawbacks. Anti-virus programs can only scan and detect known viruses. Most anti-virus programs use a weak policy in which a file or program is assumed good until proved bad. For many security applications, this weak policy may not be appropriate. In addition, most anti-virus programs are used locally where they are resident in the platform. This may not be suitable in a group work environment. Security co-processors or smart cards using cryptographic or other security techniques have limitations in speed performance, memory capacity, and flexibility. Redesigning operating systems creates software compatibility issues and causes tremendous investment in development efforts.

BRIEF DESCRIPTION OF THE DRAWINGS

The features and advantages of the present invention will become apparent from the following detailed description of the present invention in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Architecture Overview

One principle for providing security in a computer system or platform is the concept of an isolated execution architecture. The isolated execution architecture includes logical and physical definitions of hardware and software components that interact directly or indirectly with an operating system of the computer system or platform. An operating system and the processor may have several levels of hierarchy, referred to as rings, corresponding to various operational modes. A ring is a logical division of hardware and software components that are designed to perform dedicated tasks within the operating system. The division is typically based on the degree or level of privilege, namely, the ability to make changes to the platform. For example, a ring-0 is the innermost ring, being at the highest level of the hierarchy. Ring-0 encompasses the most critical, privileged components. In addition, modules in Ring-0 can also access to lesser privileged data, but not vice versa. Ring-3 is the outermost ring, being at the lowest level of the hierarchy. Ring-3 typically encompasses users or applications level and has the least privilege. Ring-1 and ring-2 represent the intermediate rings with decreasing levels of privilege.

Figure 1A:
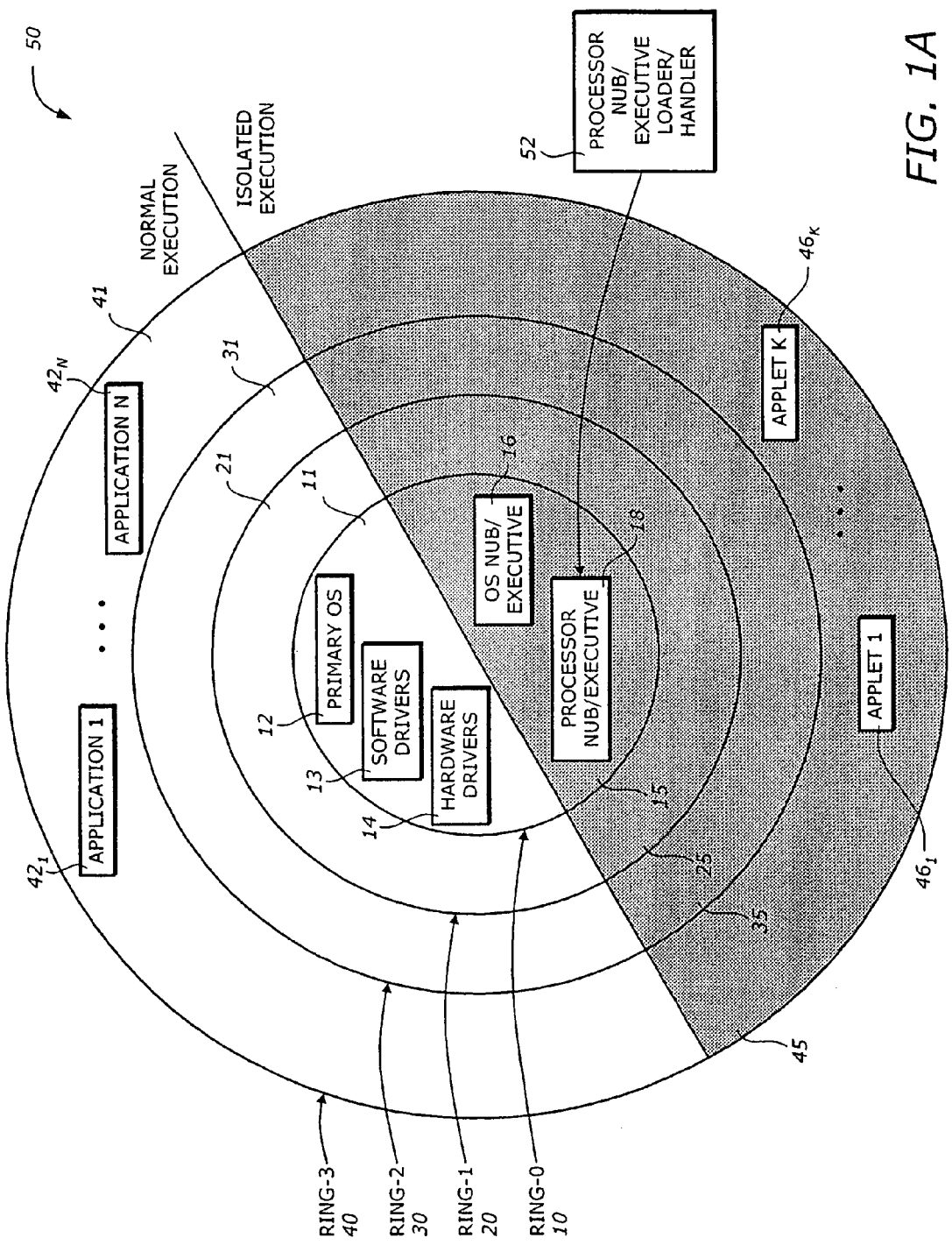
FIG. 1A is a diagram illustrating a logical operating architecture according to one embodiment of the invention.

FIG. 1A is a diagram illustrating a logical operating architecture 50 according to one embodiment of the invention. The logical operating architecture 50 is an abstraction of the components of an operating system and the processor. The logical operating architecture 50 includes ring-0 10, ring-1 20, ring-2 30, ring-3 40, and a processor nub loader 52. The processor nub loader 52 is an instance of an processor executive (PE) handler. The PE handler is used to handle and/or manage a processor executive (PE) as will be discussed later. The logical operating architecture 50 has two modes of operation: normal execution mode and isolated execution mode. Each ring in the logical operating architecture 50 can operate in both modes. The processor nub loader 52 operates only in the isolated execution mode.

Ring-0 10 includes two portions: a normal execution Ring-0 11 and an isolated execution Ring-0 15. The normal execution Ring-0 11 includes software modules that are critical for the operating system, usually referred to as kernel. These software modules include primary operating system (e.g., kernel) 12, software drivers 13, and hardware drivers 14. The isolated execution Ring-0 15 includes an operating system (OS) nub 16 and a processor nub 18. The OS nub 16 and the processor nub 18 are instances of an OS executive (OSE) and processor executive (PE), respectively. The OSE and the PE are part of executive entities that operate in a secure environment associated with the isolated area 70 and the isolated execution mode. The processor nub loader 52 is a protected bootstrap loader code held within a chipset in the system and is responsible for loading the processor nub 18 from the processor or chipset into an isolated area as will be explained later.

Similarly, ring-1 20, ring-2 30, and ring-3 40 include normal execution ring-1 21, ring-2 31, ring-3 41, and isolated execution ring-1 25, ring-2 35, and ring-3 45, respectively. In particular, normal execution ring-3 includes N applications $42_1$ to $42_N$ and isolated execution ring-3 includes K applets $46_1$ to $46_K$.

One concept of the isolated execution architecture is the creation of an isolated region in the system memory, referred to as an isolated area, which is protected by both the processor and chipset in the computer system. The isolated region may also be in cache memory, protected by a translation look aside (TLB) access check. Access to this isolated region is permitted only from a front side bus (FSB) of the processor, using special bus (e.g., memory read and write) cycles, referred to as isolated read and write cycles. The special bus cycles are also used for snooping. The isolated read and write cycles are issued by the processor executing in an isolated execution mode. The isolated execution mode is initialized using a privileged instruction in the processor, combined with the processor nub loader 52. The processor nub loader 52 verifies and loads a ring-0 nub software module (e.g., processor nub 18) into the isolated area. The processor nub 18 provides hardware-related services for the isolated execution.

One task of the processor nub 18 is to verify and load the ring-0 OS nub 16 into the isolated area, and to generate the root of a key hierarchy unique to a combination of the platform, the processor nub 18, and the operating system nub 16. The operating system nub 16 provides links to services in the primary OS 12 (e.g., the unprotected segments of the operating system), provides page management within the isolated area, and has the responsibility for loading ring-3 application modules 45, including applets $46_1$ to $46_K$, into protected pages allocated in the isolated area. The operating system nub 16 may also load ring-0 supporting modules.

The operating system nub 16 may choose to support paging of data between the isolated area and ordinary (e.g., non-isolated) memory. If so, then the operating system nub 16 is also responsible for encrypting and hashing the isolated area pages before evicting the page to the ordinary memory, and for checking the page contents upon restoration of the page. The isolated mode applets $46_1$ to $46_K$ and their data are tamper-resistant and monitor-resistant from all software attacks from other applets, as well as from non-isolated-space applications (e.g., $42_1$ to $42_N$), dynamic link libraries (DLLs), drivers and even the primary operating system 12. Only the processor nub 18 or the operating system nub 16 can interfere with or monitor the applet's execution.

Figure 1B:
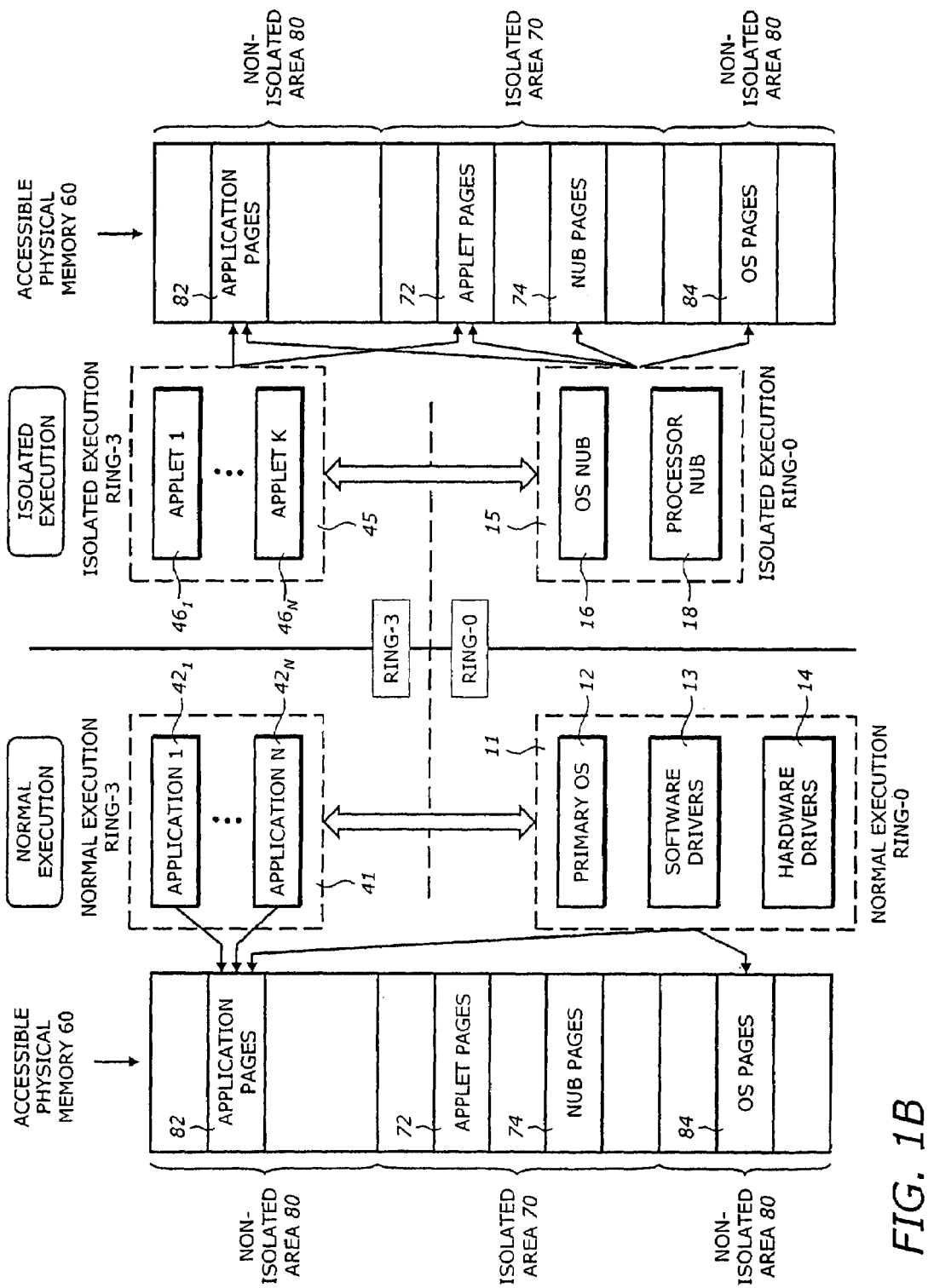
FIG. 1B is a diagram illustrating accessibility of various elements in the operating system and the processor according to one embodiment of the invention.

FIG. 1B is a diagram illustrating accessibility of various elements in the operating system 10 and the processor according to one embodiment of the invention. For illustration purposes, only elements of ring-0 10 and ring-3 40 are shown. The various elements in the logical operating architecture 50 access an accessible physical memory 60 according to their ring hierarchy and the execution mode. The accessible physical memory 60 includes an isolated area 70 and a non-isolated area 80. The isolated area 70 includes applet pages 72 and nub pages 74. The non-isolated area 80 includes application pages 82 and operating system pages 84. The isolated area 70 is accessible only to elements of the operating system and processor operating in isolated execution mode. The non-isolated area 80 is accessible to all elements of the ring-0 operating system and to the processor.

The normal execution ring-0 11 including the primary OS 12, the software drivers 13, and the hardware drivers 14, can access both the OS pages 84 and the application pages 82. The normal execution ring-3, including applications $42_1$ to $42_N$, can access only to the application pages 82. Both the normal execution ring-0 11 and ring-3 41, however, cannot access the isolated area 70.

The isolated execution ring-0 15, including the OS nub 16 and the processor nub 18, can access to both of the isolated area 70, including the applet pages 72 and the nub pages 74, and the non-isolated area 80, including the application pages 82 and the OS pages 84. The isolated execution ring-3 45, including applets $46_1$ to $46_K$, can access only to the application pages 82 and the applet pages 72. The applets $46_1$ to $46_K$ reside in the isolated area 70.

Figure 1C:
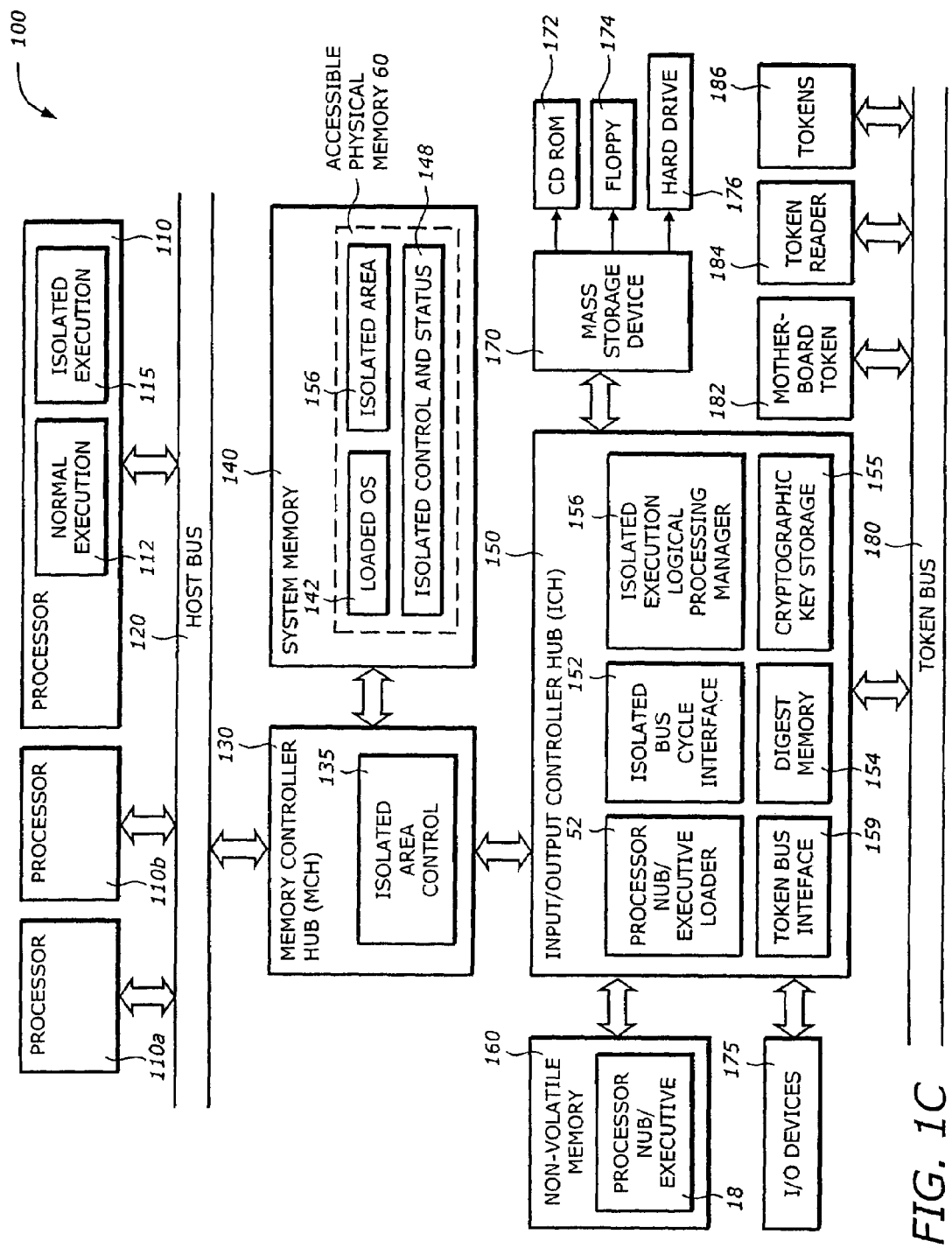
FIG. 1C is a diagram illustrating a computer system in which one embodiment of the invention can be practiced.

FIG. 1C is a diagram illustrating a computer system 100 in which one embodiment of the invention can be practiced. The computer system 100 includes a processor 110, a host bus 120, a memory controller hub (MCH) 130, a system memory 140, an input/output controller hub (ICH) 150, a non-volatile memory, or system flash, 160, a mass storage device 170, input/output devices 175, a token bus 180, a motherboard (MB) token 182, a reader 184, and a token 186. The MCH 130 may be integrated into a chipset that integrates multiple functionalities such as the isolated execution mode, host-to-peripheral bus interface, memory control. Similarly, the ICH 150 may also be integrated into a chipset together or separate from the MCH 130 to perform I/O functions. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The processor 110 represents a central processing unit of any type of architecture, such as complex instruction set computers (CISC), reduced instruction set computers (RISC), very long instruction word (VLIW), or hybrid architecture. In one embodiment, the processor 110 is compatible with an Intel Architecture (IA) processor, such as the Pentium series, the IA-32™ and the IA-64™. The processor 110 includes a normal execution mode 112 and an isolated execution circuit 115. The normal execution mode 112 is the mode in which the processor 110 operates in a non-secure environment, or a normal environment without the security features provided by the isolated execution mode. The isolated execution circuit 115 provides a mechanism to allow the processor 110 to operate in an isolated execution mode. The isolated execution circuit 115 provides hardware and software support for the isolated execution mode. This support includes configuration for isolated execution, definition of an isolated area, definition (e.g., decoding and execution) of isolated instructions, generation of isolated access bus cycles, and generation of isolated mode interrupts.

In one embodiment, the computer system 100 can be a single processor system, such as a desktop computer, which has only one main central processing unit, e.g. processor 110. In other embodiments, the computer system 100 can include multiple processors, e.g. processors 110, 110a, 110b, etc., as shown in FIG. 1C. Thus, the computer system 100 can be a multi-processor computer system having any number of processors. For example, the multi-processor computer system 100 can operate as part of a server or workstation environment. The basic description and operation of processor 110 will be discussed in detail below. It will be appreciated by those skilled in the art that the basic description and operation of processor 110 applies to the other processors 110a and 110b, shown in FIG. 1C, as well as any number of other processors that may be utilized in the multi-processor computer system 100 according to one embodiment of the present invention.

The processor 110 may also have multiple logical processors. A logical processor, sometimes referred to as a thread, is a functional unit within a physical processor having an architectural state and physical resources allocated according to some partitioning policy. Within the context of the present invention, the terms "thread" and "logical processor" are used to mean the same thing. A multi-threaded processor is a processor having multiple threads or multiple logical processors. A multi-processor system (e.g., the system comprising the processors 110, 110a, and 110b) may have multiple multi-threaded processors.

The host bus 120 provides interface signals to allow the processor 110 or processors 110, 100a, and 110b to communicate with other processors or devices, e.g., the MCH 130. In addition to normal mode, the host bus 120 provides an isolated access bus mode with corresponding interface signals for memory read and write cycles when the processor 110 is configured in the isolated execution mode. The isolated access bus mode is asserted on memory accesses initiated while the processor 110 is in the isolated execution mode. The isolated access bus mode is also asserted on instruction pre-fetch and cache write-back cycles if the address is within the isolated area address range and the processor 110 is initialized in the isolated execution mode. The processor 110 responds to snoop cycles to a cached address within the isolated area address range if the isolated access bus cycle is asserted and the processor 110 is initialized into the isolated execution mode.

The MCH 130 provides control and configuration of memory and input/output devices such as the system memory 140 and the ICH 150. The MCH 130 provides interface circuits to recognize and service isolated access assertions on memory reference bus cycles, including isolated memory read and write cycles. In addition, the MCH 130 has memory range registers (e.g., base and length registers) to represent the isolated area in the system memory 140. Once configured, the MCH 130 aborts any access to the isolated area that does not have the isolated access bus mode asserted.

The system memory 140 stores system code and data. The system memory 140 is typically implemented with dynamic random access memory (DRAM) or static random access memory (SRAM). The system memory 140 includes the accessible physical memory 60 (shown in FIG. 11B). The accessible physical memory includes a loaded operating system 142, the isolated area 70 (shown in FIG. 1B), and an isolated control and status space 148. The loaded operating system 142 is the portion of the operating system that is loaded into the system memory 140. The loaded OS 142 is typically loaded from a mass storage device via some boot code in a boot storage such as a boot read only memory (ROM). The isolated area 70, as shown in FIG. 1B, is the memory area that is defined by the processor 110 when operating in the isolated execution mode. Access to the isolated area 70 is restricted and is enforced by the processor 110 and/or the MCH 130 or other chipset that integrates the isolated area functionalities. The isolated control and status space 148 is an input/output (I/O)-like, independent address space defined by the processor 110 and/or the MCH 130. The isolated control and status space 148 contains mainly the isolated execution control and status registers. The isolated control and status space 148 does not overlap any existing address space and is accessed using the isolated bus cycles. The system memory 140 may also include other programs or data which are not shown.

The ICH 150 represents a known single point in the system having the isolated execution functionality. For clarity, only one ICH 150 is shown. The system 100 may have many ICH's similar to the ICH 150. When there are multiple ICH's, a designated ICH is selected to control the isolated area configuration and status. In one embodiment, this selection is performed by an external strapping pin. As is known by one skilled in the art, other methods of selecting can be used, including using programmable configuring registers. The ICH 150 has a number of functionalities that are designed to support the isolated execution mode in addition to the traditional I/O functions. In particular, the ICH 150 includes an isolated bus cycle interface 152, the processor nub loader 52 (shown in FIG. 1A), a digest memory 154, a cryptographic key storage 155, an isolated execution logical processor manager 156, and a token bus interface 159.

The isolated bus cycle interface 152 includes circuitry to interface to the isolated bus cycle signals to recognize and service isolated bus cycles, such as the isolated read and write bus cycles. The processor nub loader 52, as shown in FIG. 1A, includes a processor nub loader code and its digest (e.g., hash) value. The processor nub loader 52 is invoked by execution of an appropriate isolated instruction (e.g., Iso_Init) and is transferred to the isolated area 70. From the isolated area 80, the processor nub loader 52 copies the processor nub 18 from the system flash memory (e.g., the processor nub code 18 in non-volatile memory 160) into the isolated area 70, verifies and logs its integrity, and manages a symmetric key used to protect the processor nub's secrets. In one embodiment, the processor nub loader 52 is implemented in read only memory (ROM). For security purposes, the processor nub loader 52 is unchanging, tamper-resistant and non-substitutable. The digest memory 154, typically implemented in RAM, stores the digest (e.g., hash) values of the loaded processor nub 18, the operating system nub 16, and any other critical modules (e.g., ring-0 modules) loaded into the isolated execution space. The cryptographic key storage 155 holds a symmetric encryption/decryption key that is unique for the platform of the system 100. In one embodiment, the cryptographic key storage 155 includes internal fuses that are programmed at manufacturing. Alternatively, the cryptographic key storage 155 may also be created with a random number generator and a strap of a pin. The isolated execution logical processor manager 156 manages the operation of logical processors operating in isolated execution mode. In one embodiment, the isolated execution logical processor manager 156 includes a logical processor count register that tracks the number of logical processors participating in the isolated execution mode. The token bus interface 159 interfaces to the token bus 180. A combination of the processor nub loader digest, the processor nub digest, the operating system nub digest, and optionally additional digests, represents the overall isolated execution digest, referred to as isolated digest. The isolated digest is a fingerprint identifying the ring-0 code controlling the isolated execution configuration and operation. The isolated digest is used to attest or prove the state of the current isolated execution.

The non-volatile memory 160 stores non-volatile information. Typically, the non-volatile memory 160 is implemented in flash memory. The non-volatile memory 160 includes the processor nub 18. The processor nub 18 provides the initial set-up and low-level management of the isolated area 70 (in the system memory 140), including verification, loading, and logging of the operating system nub 16, and the management of the symmetric key used to protect the operating system nub's secrets. The processor nub 18 may also provide application programming interface (API) abstractions to low-level security services provided by other hardware. The processor nub 18 may also be distributed by the original equipment manufacturer (OEM) or operating system vendor (OSV) via a boot disk.

The mass storage device 170 stores archive information such as code (e.g., processor nub 18), programs, files, data, applications (e.g., applications $42_1$ to $42_N$), applets (e.g., applets $46_1$ to $46_K$) and operating systems. The mass storage device 170 may include compact disk (CD) ROM 172, floppy diskettes 174, and hard drive 176, and any other magnetic or optical storage devices. The mass storage device 170 provides a mechanism to read machine-readable media. When implemented in software, the elements of the present invention are the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable programmable ROM (EPROM), a floppy diskette, a compact disk CD-ROM, an optical disk, a hard disk, a fiber optical medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, an Intranet, etc.

I/O devices 175 may include any I/O devices to perform I/O functions. Examples of I/O devices 175 include a controller for input devices (e.g., keyboard, mouse, trackball, pointing device), media card (e.g., audio, video, graphics), a network card, and any other peripheral controllers.

The token bus 180 provides an interface between the ICH 150 and various tokens in the system. A token is a device that performs dedicated input/output functions with security functionalities. A token has characteristics similar to a smart card, including at least one reserved-purpose public/private key pair and the ability to sign data with the private key. Examples of tokens connected to the token bus 180 include a motherboard token 182, a token reader 184, and other portable tokens 186 (e.g., smart card). The token bus interface 159 in the ICH 150 connects through the token bus 180 to the ICH 150 and ensures that when commanded to prove the state of the isolated execution, the corresponding token (e.g., the motherboard token 182, the token 186) signs only valid isolated digest information. For purposes of security, the token should be connected to the digest memory.

Protecting Software Environment in Isolated Execution

The overall architecture discussed above provides a basic insight into a hierarchical executive architecture to manage a secure platform. The elements shown in FIGS. 1A, 1B, and 1C are instances of an abstract model of this hierarchical executive architecture. The implementation of this hierarchical executive architecture is a combination of hardware and software. In what follows, the processor executive, the processor executive handler, and the operating system executive are abstract models of the processor nub 18, the processor nub loader 52, and the operating system nub 16 (FIGS. 1A, 1B, and 1C), respectively.

Figure 2:
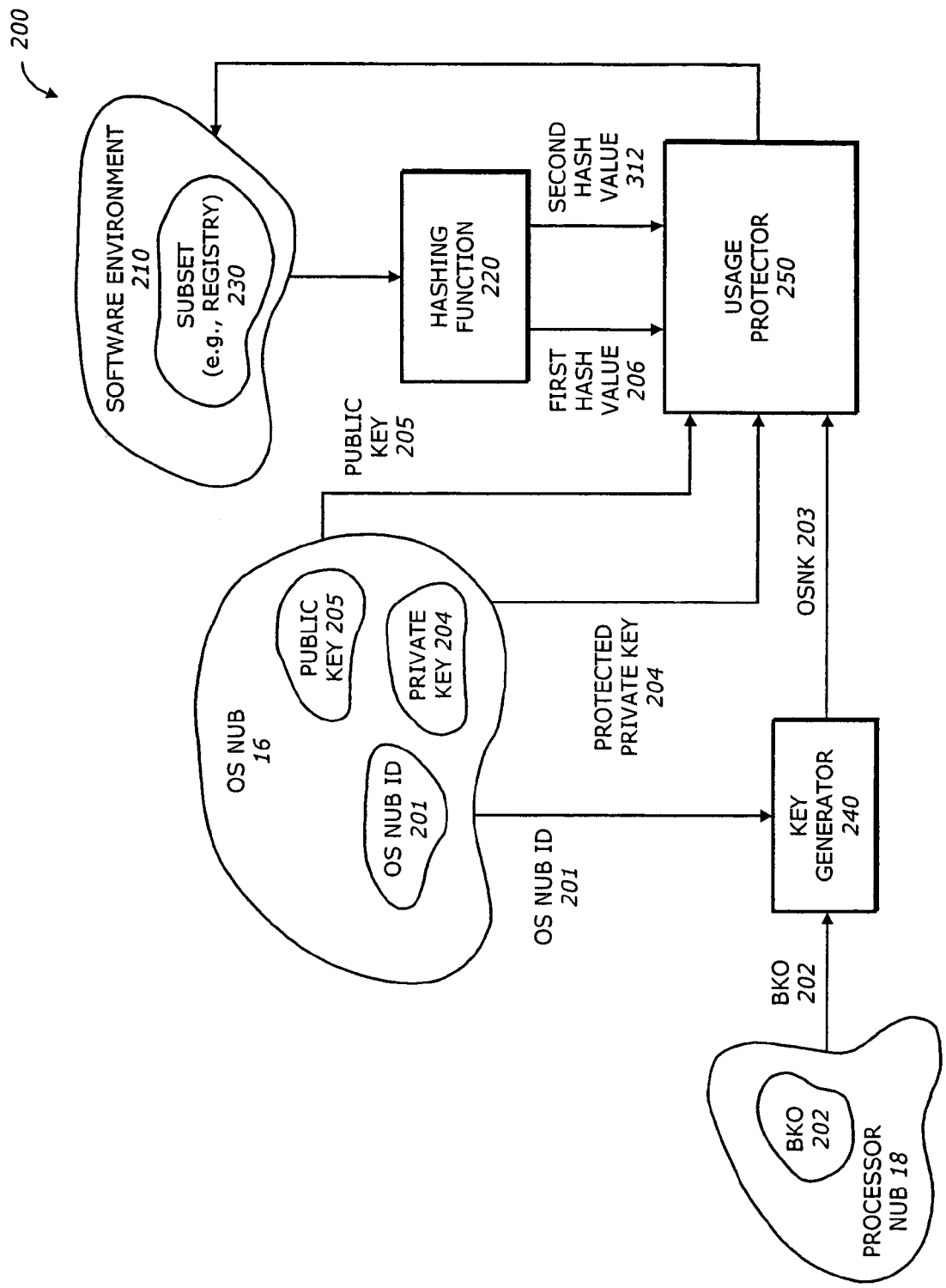
FIG. 2 is a diagram illustrating a secure platform according to one embodiment of the invention.

FIG. 2 is a diagram illustrating a secure platform 200 according to one embodiment of the invention. The secure platform 200 includes the OS nub 16, the processor nub 18, a key generator 240, a hashing function 220, and a usage protector 250, all operating within the isolated execution environment, as well as a software environment 210 that may exist either inside or outside the isolated execution environment.

The OS nub or OS executive (OSE) 16 is part of the operating system running on the secure platform 200. The OS nub 16 has an associated OS nub identifier (ID) 201, that may be delivered with the OS nub 16 or derived from an OS nub code or associated information. The OS nub ID 201 may be a pre-determined code that identifies the particular version of the OS nub 16. It may also represent a family of various versions of the OS nub 16. The OS nub 16 may optionally have access to a public and private key pair unique for the platform 200. The key pair may be generated and stored at the time of manufacturing, at first system boot, or later. The protected private key 204 may be programmed into the fuses of a cryptographic key storage 155 of the input/output control hub (ICH) 150 or elsewhere in persistent storage within the platform 200. The protected private key 204 may be based upon a random number generated by an external random number generator. In one embodiment, the protected private key 204 is generated by the platform 200 itself the first time the platform 200 is powered up. The platform 200 includes a random number generator to create random numbers. When the platform 200 is first powered up, a random number is generated upon which the protected private key 204 is based. The protected private key 204 can then be stored in the multiple key storage 164 of the non-volatile flash memory 160. The feature of the protected private key 204 is that it cannot be calculated from its associated public key 205. Only the OS nub 16 can retrieve and decrypt the encrypted private key for subsequent use. In the digital signature generation process, the protected private key 204 is used as an encryption key to encrypt a digest of a message producing a signature, and the public key 205 is used as a decryption key to decrypt the signature, revealing the digest value.

The processor nub 18 includes a master binding key (BK0) 202. The BK0 202 is generated at random when the processor nub 18 is first invoked, i.e., when it is first executed on the secure platform 200. The key generator 240 generates a key operating system nub key (OSNK) 203 which is provided only to the OS Nub 16. The OS nub 16 may supply the OSNK 203 to trusted agents, such as the usage protector 250. The key generator 240 receives the OS Nub identifier 201 and the BK0 202 to generate the OSNK 203. There are a number of ways for the key generator 240 to generate the OSNK 203. The key generator 240 generates the OSNK 203 by combining the BK0 202 and the OS Nub ID 201 using a cryptographic hash function. In one embodiment, the OS nub ID 201 identifies the OS nub 16 being installed into the secure platform 200. The OS nub ID 201 can be the hash of the OS nub 16, or a hash of a certificate that authenticates the OS nub 16, or an ID value extracted from a certificate that authenticates the OS nub 16. It is noted that a cryptographic hash function is a one-way function, mathematical or otherwise, which takes a variable-length input string, called a pre-image and converts it to a fixed-length, generally smaller, output string referred to as a hash value. The hash function is one-way in that it is difficult to generate a pre-image that matches the hash value of another pre-image. In one embodiment, the OS nub ID 201 is a hash value of one of the OS Nub 16 and a certificate representing the OS nub 16. Since the security of an algorithm rests in the key, it is important to choose a strong cryptographic process when generating a key. The software environment 210 may include a plurality of subsets (e.g., subset 230). The usage of the software environment 210 or the usage of the subset 230 is protected by the usage protector 250. The usage protector 250 uses the OSNK 203 to protect the usage of the subset 230. The software environment 210 may include an operating system (e.g., a Windows operating system, a Windows 95 operating system, a Windows 98 operating system, a Windows NT operating system, Windows 2000 operating system) or a data base. The subset 230 may be a registry in the Windows operating system or a subset of a database. Elements can be implemented in hardware or software.

The subset 230 is hashed by the hashing function 220 to produce a first hash value 206 and a second hash value 312. One way to detect intrusion or modification of the subset 230 is to compare the state of the subset before and after a time period. The first and second hash values 206 and 312 are typically generated at different times and/or at different places.

The usage protector 250 is coupled to the key generator 240 to protect usage of the software environment 210 or the subset 230, using the OSNK 203. The usage protection includes protection against unauthorized reads, and detection of intrusion, tampering or unauthorized modification. If the two hash values are not the same, then the usage protector 250 knows that there is a change in the subset 230. If it is known that this change is authorized and an updated hash value has been provided, the usage protector 250 would merely report the result. Otherwise, the usage protector 250 may generate an error or a fault function. When a user is notified of the error, fault condition, he or she would know that the subset 230 has been tampered, modified. The user may take appropriate action. Therefore, the usage of the subset 230 is protected.

The are several different embodiments of the usage protector 250. In one embodiment, the usage protector 250 decrypts the subset using the OSNK 203. In two other embodiments, the usage protector 250 uses not only the OSNK 203 but also the first hash value 206 and the second hash value 312. Yet in two other embodiments, the usage protector uses the OSNK 203, the protected private key 204 and the pubic key 205.

Figure 3A:
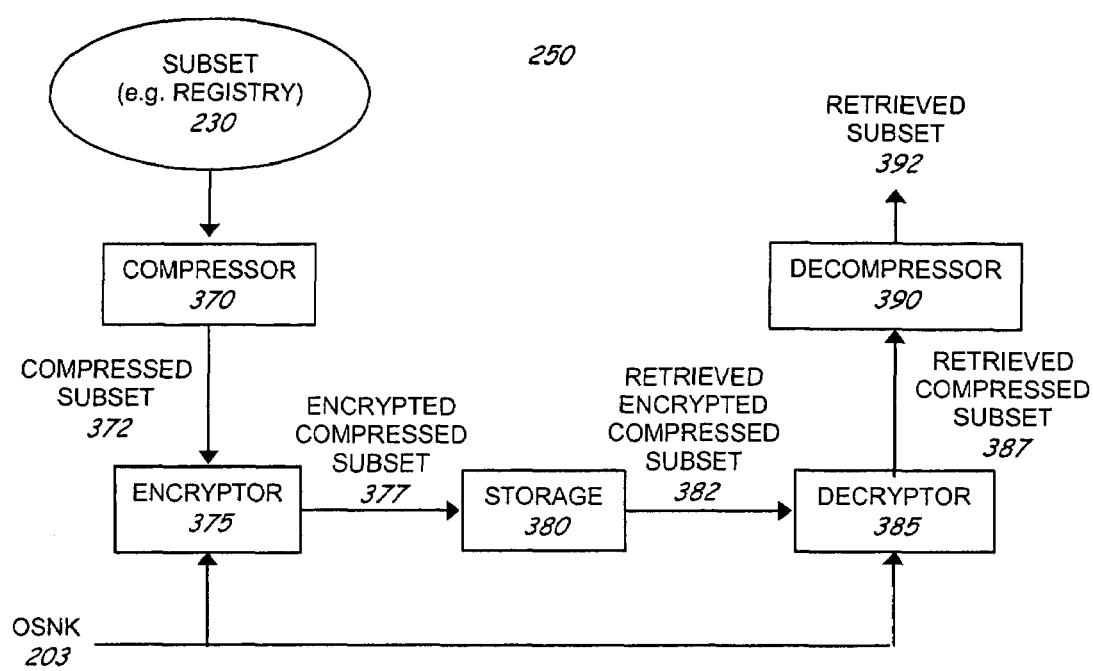
FIG. 3A is a diagram illustrating a subset of a software environment having a usage protector according to one embodiment of the invention.

FIG. 3A is a diagram illustrating the usage protector 250 shown in FIG. 2 according to one embodiment of the invention. The usage protector 250 includes a compressor 370, an encryptor 375, a storage 380, a decryptor 385, and a decompressor 390.

The compressor 370 receives the subset 230 and compresses the subset 230 to generate a compressed subset 372. The encryptor 375 then encrypts the compressed subset 372 using the OSNK 203, producing the encrypted compressed subset 377. The OSNK 203 is provided to the usage protection 250 by the key generator 240 as shown in FIG. 2. At a later time, a request can be made to the OS nub 16 to access the encrypted compressed subset 377. If this request is granted, the decryptor 385 decrypts the retrieved encrypted compressed subset 382 using the OSNK 203, producing the retrieved compressed subset 387. The decompressor 390 then expands the retrieved compressed subset 387 to produce the retrieved subset 392. The compression operation is applied to save time (i.e. speed up) and/or space for storing the subset 230 in a memory. In another embodiment, the encryptor 375 takes the subset 230 without going through the compressing process and encrypts the subset 230 to generate an encrypted subset using the OSNK 203, and the decryptor 385 decrypts the retrieved encrypted subset directly producing the retrieved subset 392. The encrypting of the compressed subset 372 or the subset 230 prevents unauthorized reads of the subset 230.

Figure 3B:
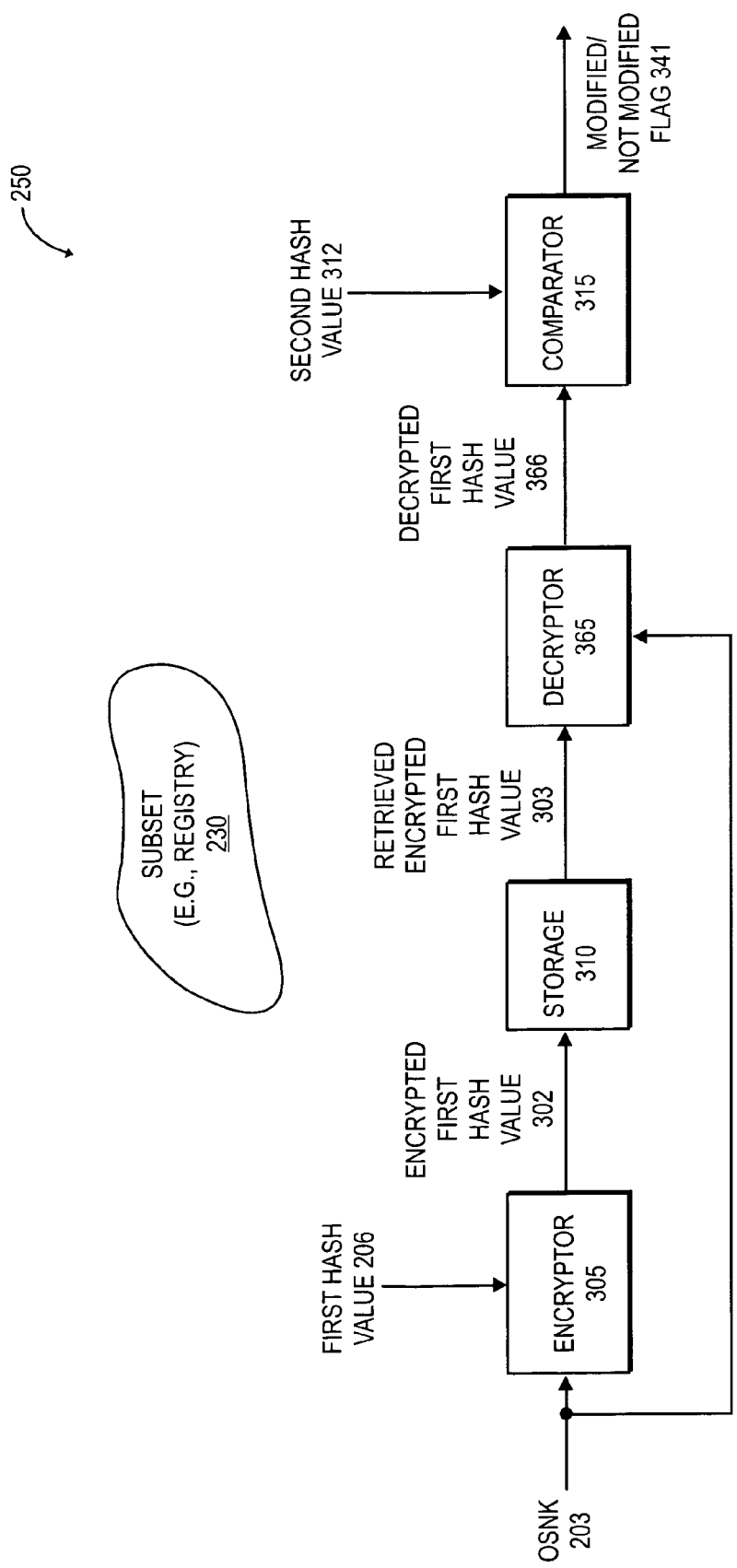
FIG. 3B is a diagram illustrating a subset of a software environment having a usage protector according to another embodiment of the invention.

FIG. 3B is a diagram illustrating the usage protector 250 shown in FIG. 2 according to another embodiment of the invention. The usage protector 250 includes an encryptor 305, a decryptor 365, a storage medium 310, and a comparator 315.

The encryptor 305 encrypts the first hash value 206 using the OSNK 203 to generate an encrypted first hash value 302. The encrypted first hash value 302 is then stored in the storage 310. Storage medium 310 may be any type of medium capable of storing the encrypted hash value 302. The storage medium 310 may be, for example, a tape or a disk (e.g., a floppy disk, a hard disk, or an optical disk). At a later time, the subset 230 is tested for integrity. The decryptor 365 decrypts the retrieved encrypted first hash value 303 using the OSNK 203. This decrypting process generates a decrypted hash value 366. This decrypted first hash value 366 is then compared to the second hash value 312 by the comparator 315 to detect if changes have been made in the subset 230. If the two values match, then subset 230 has not been changed. If the subset 230 is deliberately updated by an authorized agent, the stored encrypted hash value is also updated, and a subsequent integrity test again results in the two hash values (366 and 312) matching. If the subset 230 is modified by an unauthorized agent that does not update the stored encrypted hash value, then the subsequent integrity test results in differing hash values 366 and 312, signaling the unauthorized modification. The unauthorized agent cannot avoid this detection by attempting to generate its own version of the stored encrypted hash value, because the unauthorized agent does not have access to the OSNK 203.

Figure 3C:
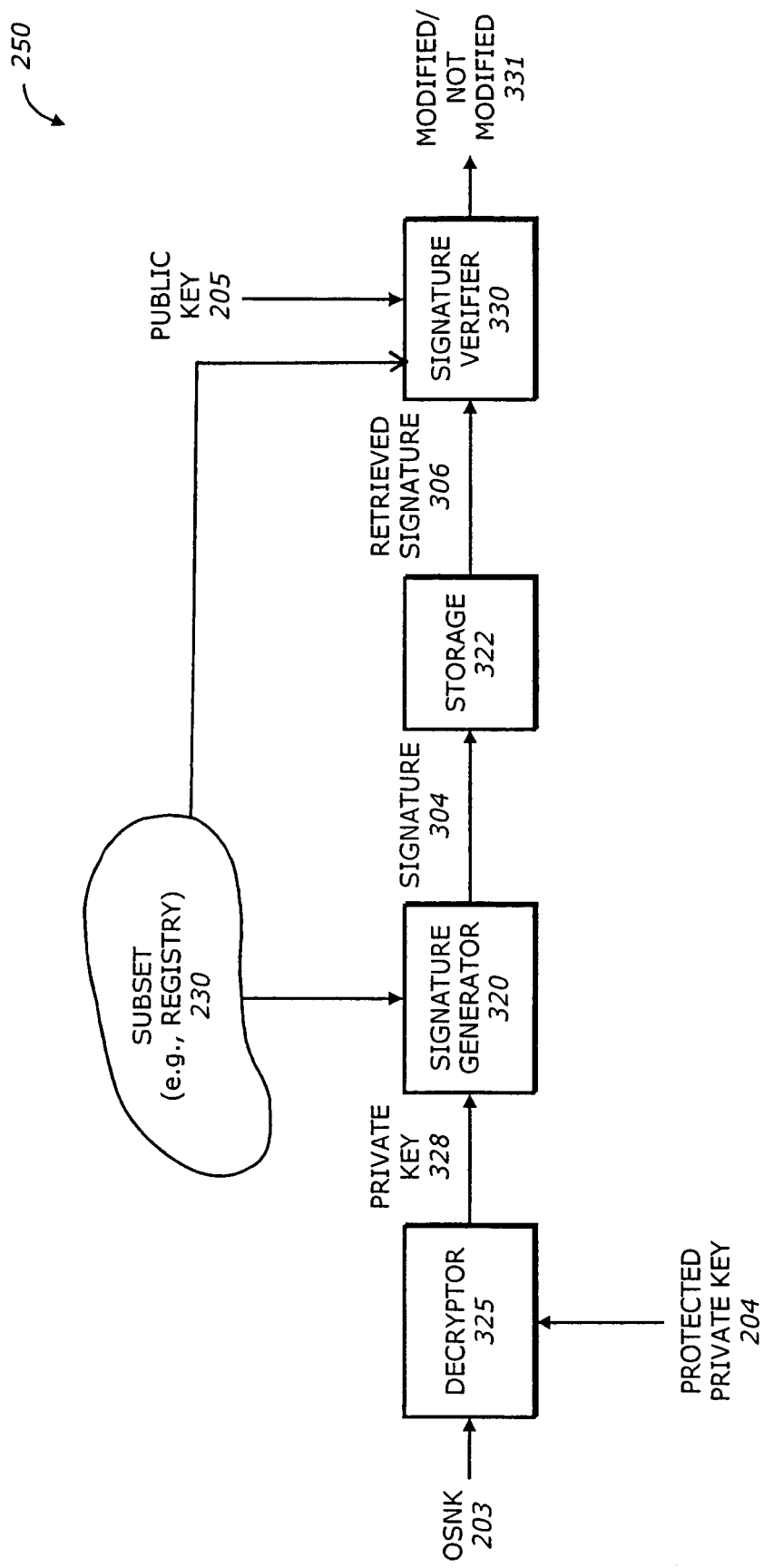
FIG. 3C is a diagram illustrating the subset of a software environment according to yet another embodiment of the invention.

FIG. 3C is a diagram illustrating the usage protector 250 shown in FIG. 2 according to one embodiment of the invention. The usage protector 250 includes a decryptor 325, a signature generator 320, a storage medium 322, and a signature verifier 330.

The decryptor 325 accepts the OS nub's encrypted private key (i.e., protected) 204, and decrypts it using the OSNK 203, exposing the private key 328 for use in the isolated environment. The signature generator 320 generates a signature 304 for the subset 230 using the private key 328. It is noted that the subset 230 may be compressed before input it into the signature generator 320 to generate the signature 304. The signature algorithm used by the signature generator 320 may be public-key digital signature algorithm which makes use of a secret private key to generate the signature, and a public key to verify the signature. Example algorithms include ElGama, Schnorr and Digital Signature Algorithms schemes just to name a few. In one embodiment, the generation of the signature 304 includes hashing the subset 230 to generate a before hash value, which is then encrypted using the private key 328 to generate the signature 304. The signature 304 is then saved in a storage medium 322. At a later time, the signature is retrieved from the storage 322, and the retrieved signature 306 is used, along with public key 205, by the signature verifier 330 to verify the subset 230. The signature verifier 330 verifies whether the subset 230 has been modified, producing a modified/not-modified indicator 331. In one embodiment, the verification process includes decrypting the retrieved signature 306 using the public key 205 to expose the before hash value. The subset 230 is hashed to generate an after hash value. The before hash value is compared to the after hash value to detect whether the subset 230 has been modified. If the two hash values match, the subset 230 is the same as it was when the signature was generated.

Figure 3D:
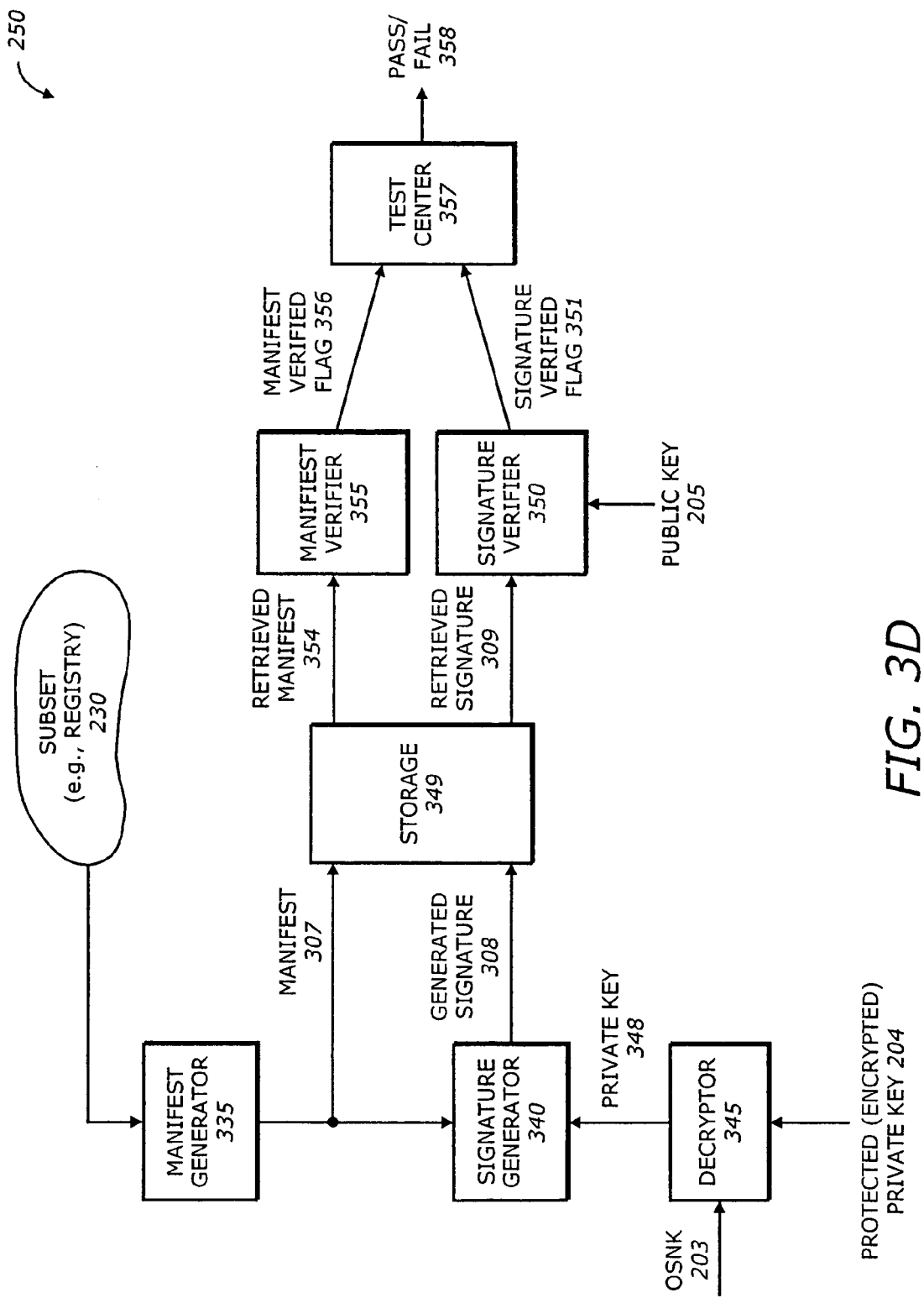
FIG. 3D is a diagram illustrating the subset of a software environment according to yet another embodiment of the invention.

FIG. 3D is a diagram illustrating the usage protector 250 according to yet another embodiment of the invention. The usage protector 250 includes a decryptor 345, a manifest generator 335, a signature generator 340, a storage medium 349, a signature verifier 350, and a manifest verifier 355.

The decryptor 345 accepts the OS nub's encrypted protected private key 204, and decrypts it using the OSNK 203, exposing the private key 348 for use in the isolated environment. The manifest generator 335 generates a manifest 307 for the subset 230. The manifest 307 represents the subset 230 in a concise manner. The manifest 307 may include a number of descriptors or entities, which characterize some relevant aspects of the subset 230. Typically, these relevant aspects are particular or specific to the subset 230 so that two different subsets have different manifests. In one embodiment, the manifest 307 represents a plurality of entities (i.e., a collection of entities) where each entry in the manifest 307 represents a hash (e.g., unique fingerprint) over one entity in the collection. The subset 230 is partitioned into one or more group where each group has a pointer and associated hash in the manifest 307. The manifest 307 is stored in a storage medium 349 for later use. The manifest 307 is also input to the signature generator 340 to generate a signature 308 over the manifest 307 using the private key 348. The generated signature 308 is also stored in a storage medium 349. At a later time, we desire to verify that the portions of the subset 230 described by the manifest have not changed. This requires verifying that the manifest itself has not been changed, and that each group in subset 230 described by the manifest has not been changed. The stored signature and manifest are retrieved from the storage medium 349. The retrieved signature 309, and the retrieved manifest 354, along with the public key 205, are used by the signature verifier 350 to test that the retrieved manifest 354 is unchanged from the original manifest 307. The signature verifier 350 produces a signature-verified flag 351, which is asserted only if the signature verifies that the manifest is unchanged. In one embodiment, the verification process includes decrypting the retrieved signature 309 using the public key 205 to expose the before hash value. The retrieved manifest 354 is hashed to generate an after hash value. The before hash value is compared to the after hash value to detect whether the retrieved manifest 354 has been modified. If the two hash values match, the retrieved manifest 354 is the same as it was when the signature was generated. The retrieved manifest 354 is also supplied to the manifest verifier 355, which uses the descriptive information in the retrieved manifest 354 to selectively verify portions of subset 230. In a typical embodiment, this involves hashing each group in subset 230, where the group is identified by information in the retrieved manifest 354, and comparing the newly generated hash value against the hash value for the group stored in the retrieved manifest 354. The manifest verifier 355 produces a manifest-verified flag 356, which is asserted if all entries described by the retrieved manifest 354 are verified as unchanged. If both the manifest-verified flag and the signature-verified flag are asserted, then the overall verification process passes, and the selected portions of subset 230 are known to be the same as when the signed manifest was originally generated, and a pass/fail flag 358 is asserted. Note that the signature verifier 350 and the manifest verifier 355 can be invoked in any order.

Figure 3E:
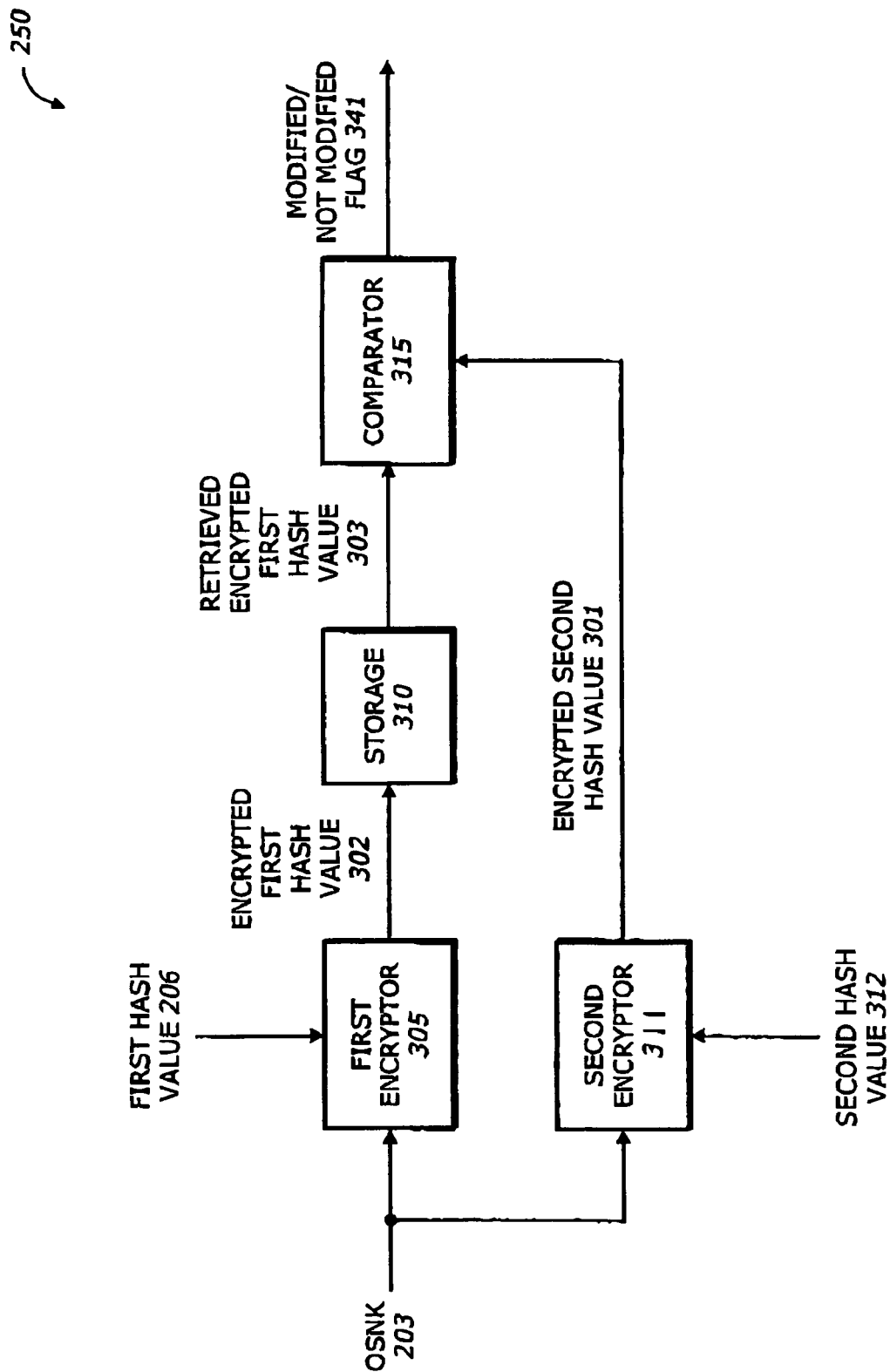
FIG. 3E is a diagram illustrating the subset of a software environment according to yet another embodiment of the invention.

FIG. 3E is a diagram illustrating the usage protector 250 shown in FIG. 2 according to another embodiment of the invention. The usage protector 250 includes a first encryptor 305, a second encryptor 311, a storage medium 310, and a comparator 315.

The first encryptor 305 encrypts the first hash value 206 using the OSNK 203. The first hash value 206 is provided by the hashing function 220 as shown in FIG. 2. The first encryptor 305 takes the first hash value 206 and encrypts it to generate an encrypted first hash value 302 using the OSNK 203. The encrypted hash value 302 is then stored in a storage 310 for later use. The encryption by the OSNK 203 allows the encrypted first hash value 302 to be stored in arbitrary (i.e., unprotected) storage media. Storage medium 310 may be any type of medium capable of storing information (e.g., the encrypted hash value 302). The storage medium 310 may be, for example, a tape or a disk (e.g., a floppy disk, a hard disk, or an optical disk). The second encryptor 365 311 encrypts the second hash value 312 to generate an encrypted second hash value 301 using the OSNK 203. The second hash value 312 is provided by the hash function 220. The first encryptor 305 and the second encryptor 311 use the same encryption algorithm, and this algorithm produces identical repeatable results for a given input. The encrypted first hash value 302 is now retrieved from the storage 310 for comparing with the encrypted second hash value 301. The comparator 315 compares the encrypted second hash value 301 with the retrieved encrypted first hash value 303 to detect if the subset 230 has been modified or tampered with. In the case where the subset 230 is deliberately updated by an authorized agent, the stored encrypted hash value is also updated. Since the modification of the subset 230 is authorized, the second encrypted hash value 301 is the same as the retrieved first encrypted first hash value 303. In the case where the subset 230 has been unauthorized modified or tampered with, the comparator 315 generates a modified/not-modified flag indicating the subset 230 has been modified and therefore, the subset 230 should not be used. An attacker cannot simply replace the first encrypted hash value 303 with one corresponding to the unauthorized modified subset 230, because the attacker does not have access to the OSNK 203 used to encrypt the hash value.

Figure 4:
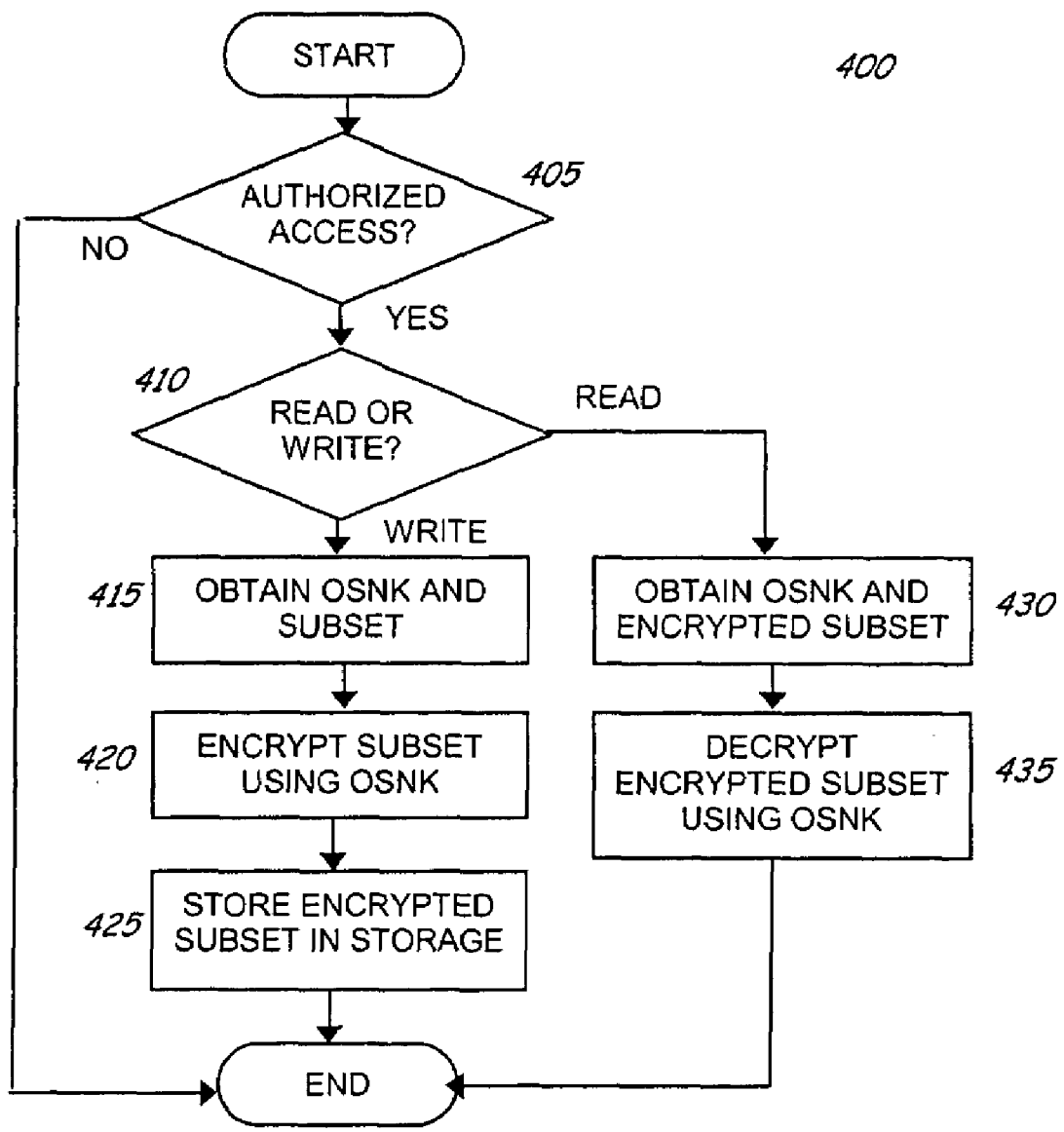
FIG. 4 is a flowchart illustrating a process to protect usage of a subset of a software environment according to one embodiment of the invention.

FIG. 4 is a flowchart illustrating a process 400 to protect usage of the software environment 210 or subset 230 according to one embodiment of the invention.

Upon START, the process 400 checks to see whether accessing to the subset is authorized (Block 405). If accessing to the subset is authorized, the process 400 is terminated. Otherwise, the process 400 checks to see if the accessing to the subset is a read or a write (Block 410). If it is a write, the process 400 obtains the OSNK and the subset (Block 415). The process 400 then encrypts the subset using the OSNK (Block 420) and stores the encrypted subset in a storage (Block 425), the process 400 is terminated. If accessing to the subset is a read, the process 400 obtains the OSNK and the encrypted subset (Block 430). The process then decrypts the encrypted subset using the OSNK (Block 435), the process 400 is the terminated.

Figure 5:
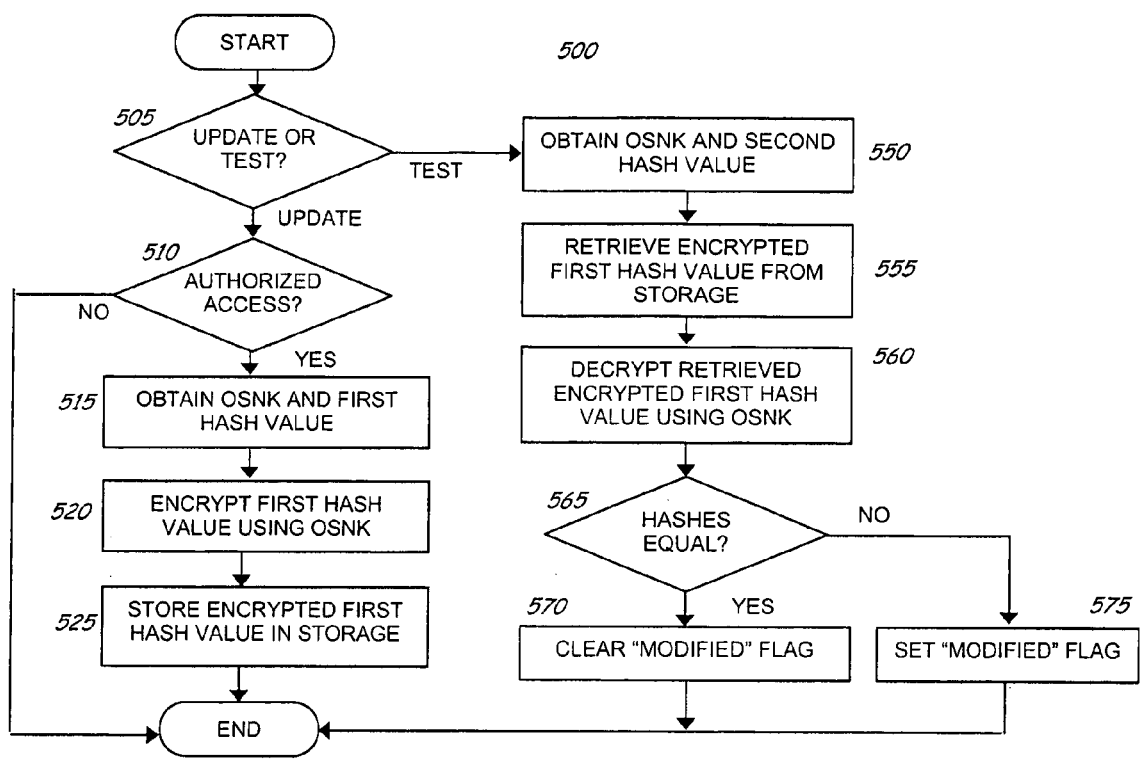
FIG. 5 is a flowchart illustrating the process to protect usage of the subset according to another embodiment of the invention.

FIG. 5 is a flowchart illustrating a process 500 to protect usage of the subset of the software environment according to one embodiment of the invention.

Upon START, the process 500 checks to see whether the subset is to be updated or to be tested (Block 505). If it is to be updated, the process 500 checks to see whether accessing the subset is authorized (Block 510). If accessing the subset is not authorized, the process 500 is terminated. If accessing the subset is authorized, the process 500 obtains the OSNK and the first hash value (Block 515) and encrypts the first hash value using the OSNK (Block 520). The process 500 then stores the encrypted first hash value in a storage for later use (Block 525). The process is terminated. If the subset is to be tested, the process 500 then obtains the OSNK and the second hash value (Block 550). The process 500 also retrieves the encrypted first hash value from the storage (Block 555) and decrypts it using the OSNK (Block 560). The process 500 then checks to see whether the two hash values are equal (Block 565). If the two hash values are equal, the process 500 clears "modified" flag (Block 570) and is terminated. Otherwise, the process 500 sets "modified" flag (Block 575) and is terminated.

Figure 6:
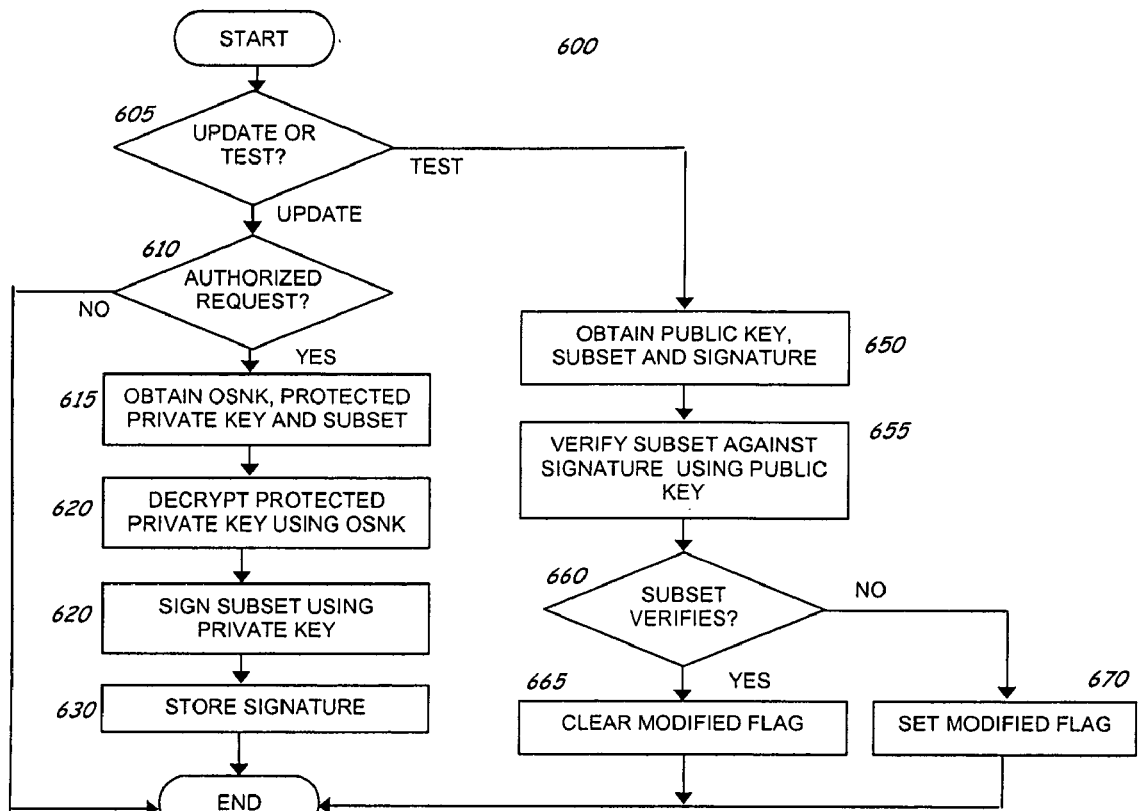
FIG. 6 is a flowchart illustrating the process to protect usage of the subset according to yet another embodiment of the invention.

FIG. 6 is a flowchart illustrating a process to protect usage of a subset of a software environment according to yet another embodiment of the invention.

Upon START, the process 600 checks to see whether the subset is to be updated or to be tested (Block 605). If it is to be updated, the process 600 checks to see whether the request to be updated is authorized (Block 610). If it is not authorized, the process 600 is terminated. Otherwise, the process 600 obtains the OSNK, the protected private key and the subset (Block 615). The process 600 then decrypts the protected private using the OSNK (Block 620) and signs the subset using the private key (Block 625). The process 600 stores the signature in a storage (Block 630) and is terminated. If the subset is to be tested, the process 600 obtains the public key, the subset, and the signature (Block 650). The process 600 verifies the subset against the signature using the public key (Block 655). The process 600 then checks whether the subset is verified (Block 660). If the subset is verified, the process 600 clears "modified" flag (Block 665) and is terminated. Otherwise, the process 600 sets "modified" flag (Block 670) and is terminated.

Figure 7:
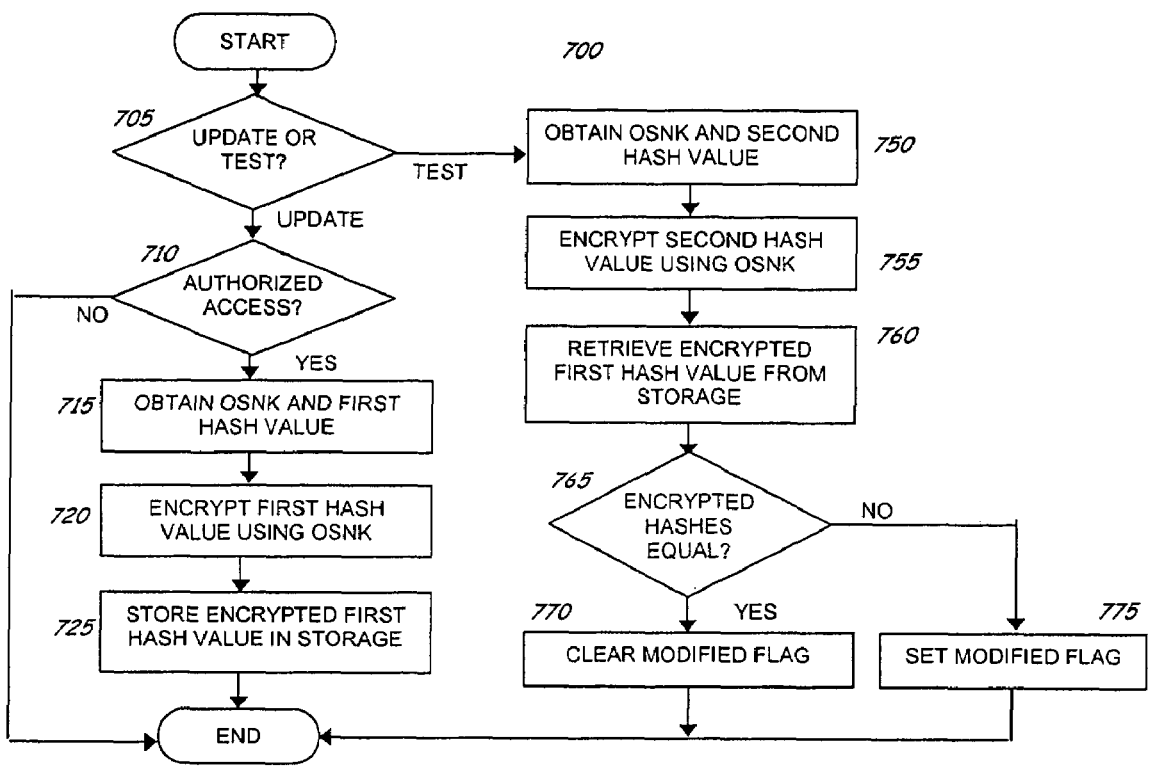
FIG. 7 is a flowchart illustrating a process to protect usage of the subset according to yet another embodiment of the invention.

FIG. 7 is a flowchart illustrating a process 700 to protect usage of a subset of a software environment according to yet another embodiment of the invention.

Upon START, the process 700 checks to see whether the subset is to be updated or tested (Block 705). If it is to be updated, the process 700 then checks to see whether the accessing to the subset is authorized (Block 710). If it is not authorized, the process 700 is terminated. Otherwise, the process 700 obtains the OSNK and the first hash value (Block 715) and encrypts the first hash value using the OSNK (Block 720). The process then stores the encrypted first hash value in a storage (Block 725) and is terminated. If the subset is to be tested, the process 700 obtains the OSNK and the second hash value (Block 750) and encrypts the second hash value using the OSNK (Block 755). The process 700 then retrieves the encrypted first hash value from the storage (Block 760) and checks to see whether the encrypted hashes are equal (Block 765). If they are equal, the process 700 clears "modified" flag and is terminated. Otherwise, the process 700 sets "modified" flag (Block 775) and is terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
    a key generator to generate an operating system nub key (OSNK) unique to an operating system (OS) nub, the OS nub being part of an operating system to run on a platform comprising a processor capable of operating in an isolated execution mode in a ring 0 operating mode, wherein the processor also supports one or more higher ring operating modes, as well as a normal execution mode in at least the ring 0 operating mode; and
    a usage protector coupled to the key generator to protect usage of a subset of a software environment using the OSNK;
    the key generator to generate the OSNK based at least in part on a master binding key (BK0) of the platform and an identification of the OS nub;
    wherein the usage protector performs at least one operation selected from the group consisting of:
    encrypting a value while operating in isolated execution mode; and
    decrypting an encrypted value while operating in isolated execution mode.

2. The apparatus of claim 1, wherein the identification comprises a hash value of at least one item selected from the group consisting of the OS nub and a certificate representing the OS nub.

3. The apparatus of claim 1 wherein the usage protector comprises:
    an encryptor to encrypt the subset of the software environment using the OSNK, the encrypted subset being stored in a storage; and
    a decryptor to decrypt the encrypted subset using the OSNK, the encrypted subset being retrieved from the storage.

4. The apparatus of claim 1 wherein the usage protector comprises:
    an encryptor to encrypt a first hash value of the subset of the software environment using the OSNK, the encrypted first hash value being stored in a storage;

a decryptor to decrypt the encrypted first hash value using the OSNK, the encrypted first hash value being retrieved from the storage; and a comparator to compare the decrypted first hash value to a second hash value to generate a compared result, the compared result indicating whether the subset of the software environment has been modified.

5. The apparatus of claim 1 wherein the usage protector comprises:

a first encryptor to encrypt a first hash value of the subset of the software environment using the OSNK, the encrypted first hash value being stored in a storage;

a second encryptor to encrypt a second hash value using the OSNK; and a comparator to compare the encrypted second hash value to the encrypted first hash value to generate a compared result, the encrypted first hash value being retrieved from the storage, the compared result indicating whether the subset of the software environment has been modified.

6. The apparatus of claim 1 wherein the usage protector comprises:

a decryptor to decrypt a protected private key to generate a private key using the OSNK;

a signature generator coupled to the decryptor to generate a signature of the subset of the software environment using the private key, the signature being stored in a storage; and a signature verifier to verify the signature to generate a modified/not modified flag using a public key, the signature being retrieved from the storage, the modified/not modified flag indicating whether the subset has been modified.

7. The apparatus of claim 1 wherein the usage protector comprises:

a manifest generator to generate a manifest of the subset of the software environment, the manifest describing the subset of the software environment, the manifest being stored in a storage;

a signature generator coupled to the manifest generator to generate a manifest signature using a private key, the private key being decrypted by a decryptor using the OSNK, the manifest signature being stored in the storage;

a signature verifier to verify the manifest signature to generate a signature verified flag using a public key, the manifest signature being retrieved from the storage; and a manifest verifier to verify the manifest to generate a manifest verified flag, the manifest being retrieved from the storage, the manifest verified flag and the signature verified flag being tested at a test center, the test center generating a pass/fail signal to indicate whether the subset has been modified.

8. The apparatus of claim 1 wherein the subset of the software environment comprises a registry of an operating system.

9. The apparatus of claim 1, wherein the BK0 is generated at random on a first invocation of a processor nub.

10. A method comprising:

generating an operating system nub key (OSNK) unique to an operating system (OS) nub, the OS nub being part of an operating system to run in a software environment on a platform comprising a processor capable of operating in an isolated execution mode in a ring 0 operating mode, wherein the processor also supports one or more higher ring operating modes, as well as a normal execution mode in at least the ring 0 operating mode; and protecting usage of a subset of the software environment using the OSNK;

wherein the operation of protecting usage of a subset of the software environment comprises at least one operation selected from the group consisting of:

encrypting a value while operating in isolated execution mode; and decrypting an encrypted value while operating in isolated execution mode; and wherein the operation of generating an OSNK comprises generating the OSNK based at least in part on an identification of the OS nub and a master binding key (BK0) of the platform.

11. The method of claim 10, wherein the identification comprises a hash value of at least one item selected from the group consisting of the OS nub and a certificate representing the OS nub.

12. The method of claim 10 wherein protecting usage comprises:

encrypting the subset of the software environment using the OSNK;

storing the encrypted subset in a storage; and decrypting the encrypted subset from the storage using the OSNK.

13. The method of claim 10 wherein protecting usage comprises:

encrypting a first hash value of the subset of the software environment using the OSNK, the encrypted first hash value being stored in a storage;

decrypting the encrypted first hash value of the subset of the software environment using the OSNK, the encrypted first hash value being retrieved from the storage; and comparing the decrypted first hash value to a second hash value to generate a compared result, the decrypted first hash value being retrieved from the storage, the compared result indicating whether the subset of the software environment has been modified.

14. The method of claim 10 wherein protecting usage comprises:

encrypting a first hash value of the subset of the software environment using the OSNK, the encrypted first hash value being stored in a storage;

encrypting a second hash value using the OSNK; and comparing the encrypted first hash value to the encrypted second hash value to generate a compared result, the encrypted first hash value being retrieved from the storage, the compared result indicating whether the subset of the software environment has been modified.

15. The method of claim 10 wherein protecting usage comprises:

decrypting a protected private key to generate a private key using the OSNK;

generating a signature of the subset of the software environment using the private key, the signature being stored in a storage; and verifying the signature to generate a modified/not modified flag using a public key, the signature being retrieved from the storage, the modified/not modified flag indicating whether the subset of the software environment has been modified.

16. The method of claim 10 wherein detecting comprises:

generating a manifest of the subset of the software environment, the manifest describing the subset of the software environment, the manifest being stored in a storage;

generating a manifest signature of the manifest using a private key, the private key being decrypted using the OSNK, the manifest signature being stored in the storage;

verifying the manifest signature to generate a signature verified flag using a public key, the manifest signature being retrieved from the storage; and verifying the manifest to generate a manifest verified flag, the manifest being retrieved from the storage, the manifest verified flag and the signature verified flag being tested at a test center, the test center generating a pass/fail signal, the pass/fail signal indicating whether the subset of the software environment has been modified.

17. The method of claim 10 wherein the subset of the software environment comprises a registry of the operating system.

18. The method of claim 10, wherein the BK0 is generated at random on a first invocation of a processor nub.

19. A computer program product comprising:

a computer usable medium having computer program code embodied therein, the computer program product having:

computer readable program code to generate an operating system nub key (OSNK) unique to an operating system (OS) nub, the OS nub being part of an operating system to run in a software environment on a platform comprising a processor capable of operating in an isolated execution mode in a ring 0 operating mode, wherein the processor also supports one or more higher ring operating modes, as well as a normal execution mode in at least the ring 0 operating mode; and computer readable program code to protect usage of a subset of the software environment using the OSNK;

wherein the computer readable program code to generate the OSNK comprises computer readable program code to generate the OSNK based at least in part on an identification of the OS nub and a master binding key (BK0) of the platform; and wherein the operation of protecting usage of a subset of the software environment comprises at least one operation selected from the group consisting of:

encrypting a value while operating in isolated execution mode; and decrypting an encrypted value while operating in isolated execution mode.

20. The computer program product of claim 19, wherein the identification comprises a hash value of at least one item selected from the group consisting of the OS nub and a certificate representing the OS nub.

21. The computer program product of claim 19 wherein the computer readable program code for protecting usage comprises:

computer readable program code for encrypting the subset of the software environment using the OSNK;

computer readable program code for storing the encrypted subset; and computer readable program code for decrypting the encrypted subset from the storage using the OSNK.

22. The computer program product of claim 19 wherein the computer readable program code for protecting usage comprises:

computer readable program code for encrypting a first hash value of the subset of the software environment using the OSNK, the encrypted first hash value being stored in a storage;

computer readable program code for decrypting the encrypted first hash value of the subset of the software environment using the OSNK, the encrypted first hash value being retrieved from the storage; and computer readable program code for comparing the decrypted first hash value to a second hash value to generate a compared result, the decrypted first hash value being retrieved from the storage, the compared result indicating whether the subset of the software environment has been modified.

23. The computer program product of claim 19 wherein the computer readable program code for protecting usage comprises:

computer readable program code for encrypting a first hash value of the subset of the software environment using the OSNK, the encrypted first hash value being stored in a storage;

computer readable program code for encrypting a second hash value using the OSNK; and computer readable program code for comparing the encrypted first hash value to the encrypted second hash value to generate a compared result, the encrypted first hash value being retrieved from the storage, the compared result indicating whether the subset of the software environment has been modified.

24. The computer program product of claim 19 wherein the computer readable program code for protecting usage comprises:

computer readable program code for decrypting a protected private key to generate a private key using the OSNK;

computer readable program code for generating a signature of the subset of the software environment using the private key, the signature being stored in a storage; and computer readable program code for verifying the signature to generate a modified/not modified flag using a public key, the signature being retrieved from the storage, the modified/not modified flag indicating whether the software environment has been modified.

25. The computer program product of claim 19 wherein the computer readable program code for protecting usage comprises:

computer readable program code for generating a manifest of the subset of the software environment, the manifest being stored in a storage;

computer readable program code for generating a manifest signature of the manifest using a private key, the private key being decrypted using the OSNK, the manifest signature being stored in the storage;

computer readable program code for verifying the manifest signature to generate a signature verified flag using a public key, the manifest signature being retrieved from the storage; and computer readable program code for verifying the manifest to generate a manifest verified flag, the manifest being retrieved from the storage, the manifest verified flag and the signature verified flag being tested at a test center, the test center generating a pass/fail signal, the pass/fail signal indicating whether the subset of the software environment has been modified.

26. The computer program product of claim 19 wherein the subset of the software environment comprises a registry of an operating system.

27. The computer program product of claim 19, wherein the BK0 is generated at random on a first invocation of a processor nub.

28. A system comprising:
a processor capable of operating in an isolated execution mode in a ring 0 operating mode, wherein the processor also supports one or more higher ring operating modes, as well as a normal execution mode in at least the ring 0 operating mode;
storage response to the processor, the storage storing at least a subset of a software environment to run on the system:
an operating system (OS) nub;
a key generator to generate an operating system nub key (OSNK) unique to the OS nub, based at least in part on an identification of the OS nub and a master binding key (BK0) of the system; and
a usage protector coupled to the key generator to protect usage of a subset of the software environment using the OSNK;
wherein the operation of protecting usage of a subset of the software environment comprises at least one operation selected from the group consisting of:
encrypting a value while operating in isolated execution mode; and
decrypting an encrypted value while operating in isolated execution mode.

29. The system of claim 28, wherein the identification comprises a hash value of at least one item selected from the group consisting of the OS nub and a certificate representing the OS nub.

30. The system of claim 28 wherein the usage protector comprises:
an encryptor to encrypt the subset of the software environment using the OSNK, the encrypted subset being stored in a storage; and
a decryptor to decrypt the encrypted subset using the OSNK, the encrypted subset being retrieved from the storage.

31. The system of claim 28 wherein the usage protector comprises:
an encryptor to encrypt a first hash value of the subset of the software environment using the OSNK, the encrypted first hash value being stored in a storage;
a decryptor to decrypt the encrypted first hash value using the OSNK, the encrypted first hash value being retrieved from the storage; and
a comparator to compare the decrypted first hash value to a second hash value to generate a compared result, the compared result indicating whether the subset of the software environment has been modified.

32. The system of claim 28 wherein the usage protector comprises:
a first encryptor to encrypt a first hash value of the subset of the software environment using the OSNK, the encrypted first hash value being stored in a storage;
a second encryptor to encrypt a second hash value using the OSNK; and
a comparator to compare the encrypted second hash value to the encrypted first hash value to generate a compared result, the encrypted first hash value being retrieved from the storage, the compared result indicating whether the subset of the software environment has been modified.

33. The system of claim 28 wherein the usage protector comprises:
a decryptor to decrypt a protected private key to generate a private key using the OSNK;
a signature generator coupled to the decryptor to generate a signature of the subset of the software environment using the private key, the signature being stored in a storage; and
a signature verifier to verify the signature to generate a modified/not modified flag using a public key, the signature being retrieved from the storage, the modified/not modified flag indicating whether the subset of the software environment has been modified.

34. The system of claim 28 wherein the usage protector comprises:
a manifest generator to generate a manifest of the subset of the software environment, the manifest describing the subset of the software environment, the manifest being stored in a storage;
a signature generator coupled to the manifest generator to generate a manifest signature of the manifest using a private key, the private key being decrypted using the OSNK, the manifest signature being stored in the storage;
a signature verifier to verify the manifest signature to generate a signature verified flag using a public key, the manifest signature being retrieved from the storage; and
a manifest verifier to verify the manifest to generate a manifest verified flag, the manifest being retrieved from the storage, the manifest verified flag and the signature verified flag being tested by a test center, the test center generating a pass/fail signal indicating whether the subset has been modified.

35. The system of claim 28 wherein the subset of the software environment comprises a registry of an operating system.

36. The system of claim 28, wherein the BK0 is generated at random on a first invocation of a processor nub.

37. The system of claim 28, further comprising:
a memory responsive to the processor, the memory to include an isolated memory area, the isolated memory area to be accessible to the processor in the isolated execution mode and inaccessible to the processor in the normal execution mode; and
the isolated memory area operable to receive the OS nub during a boot process.

38. An apparatus according to claim 1, wherein:
the platform comprises a memory responsive to the processor, the memory to include an isolated memory area, the isolated memory area to be accessible to the processor in the isolated execution mode and inaccessible to the processor in the normal execution mode; and
the isolated memory area operable to receive the OS nub during a boot process.

39. A method according to claim 10, wherein:
the platform comprises a memory responsive to the processor, the memory to include an isolated memory area, the isolated memory area to be accessible to the processor in the isolated execution mode and inaccessible to the processor in the normal execution mode; and
the method further comprises loading the OS nub into the isolated memory area during a boot process for the platform.

40. A computer program product according to claim 19, comprising:
computer readable program code to load the OS nub into an isolated memory area of the platform during a boot process for the platform, the isolated memory area to reside in a memory responsive to the processor, the isolated memory area to be accessible to the processor in the isolated execution mode and inaccessible to the processor in the normal execution mode.

* * * * *